(12) United States Patent
Higashi et al.

(10) Patent No.: US 7,147,080 B2
(45) Date of Patent: Dec. 12, 2006

(54) STEERING APPARATUS FOR VEHICLE

(75) Inventors: Masayasu Higashi, Tondabayashi (JP);
Shingo Maeda, Kashiwara (JP);
Masaya Segawa, Yamatokooriyama (JP); Shuuji Kimura, Kashihara (JP);
Ryouhei Hayama, Nabari (JP);
Tomoyasu Kada, Kaizuka (JP)

(73) Assignee: Koyo Seiko Co., Ltd., Osaka (JP)

( * ) Notice: Subject to any disclaimer, the term of this patent is extended or adjusted under 35 U.S.C. 154(b) by 208 days.

(21) Appl. No.: 10/403,094

(22) Filed: Apr. 1, 2003

(65) Prior Publication Data

US 2003/0183438 A1 Oct. 2, 2003

(30) Foreign Application Priority Data

Apr. 1, 2002 (JP) ............... 2002-099170

(51) Int. Cl.
*B60K 26/00* (2006.01)
(52) U.S. Cl. .............. 180/315; 74/491; 180/333; 180/402
(58) Field of Classification Search ............... 180/315, 180/333, 402, 19.1, 19.2, 19.3; 280/771; 74/491, 492, 552
See application file for complete search history.

(56) References Cited

U.S. PATENT DOCUMENTS

| | | | |
|---|---|---|---|
| 3,312,123 A | 4/1967 | Rumpf | |
| 4,646,869 A | 3/1987 | Kerner, Jr. | |
| 6,224,093 B1 * | 5/2001 | Ochiai et al. | ............... 280/731 |
| 6,260,437 B1 * | 7/2001 | Landis | ................ 74/552 |
| 6,324,935 B1 * | 12/2001 | Schoen et al. | ................ 74/493 |
| 6,634,454 B1 * | 10/2003 | Sugitani et al. | ............. 180/402 |
| 6,719,087 B1 * | 4/2004 | Demerly | ................ 180/402 |
| 6,840,346 B1 * | 1/2005 | Sugitani et al. | ............. 180/402 |
| 6,898,496 B1 * | 5/2005 | Chernoff et al. | .............. 701/41 |

FOREIGN PATENT DOCUMENTS

| | | |
|---|---|---|
| DE | 196 21 023 C1 | 9/1997 |
| EP | 1 065 130 A2 | 1/2001 |
| JP | 6-1255 A | 1/1994 |
| JP | 6-144270 A | 5/1994 |
| JP | 8-34353 A | 2/1996 |
| JP | 10-218000 A | 8/1998 |
| JP | 2002160642 | 6/2002 |
| WO | WO 88/09279 | 12/1988 |
| WO | WO 01/76932 A1 | 10/2001 |

* cited by examiner

*Primary Examiner*—Eric Culbreth
(74) *Attorney, Agent, or Firm*—Birch, Stewart, Kolasch & Birch, LLP

(57) ABSTRACT

The steering device is constructed by supporting a center portion of a rectangle-plate-shaped operation plate at one end of a supporting shaft projected from the front face of a dashboard so as to freely swing in right and left directions. A steering apparatus for a vehicle having the steering device detects the swing direction and the swing angle of the operation plate with a steering angle sensor provided at a support portion and moves a steering mechanism in the detected direction in accordance with the detected angle so as to steer the vehicle. With this structure, a load in steering can be decreased and tiredness in driving can be reduced. Furthermore, such a steering apparatus can realize a steering device which physically handicapped drivers can operate easily.

15 Claims, 16 Drawing Sheets

F I G. 7
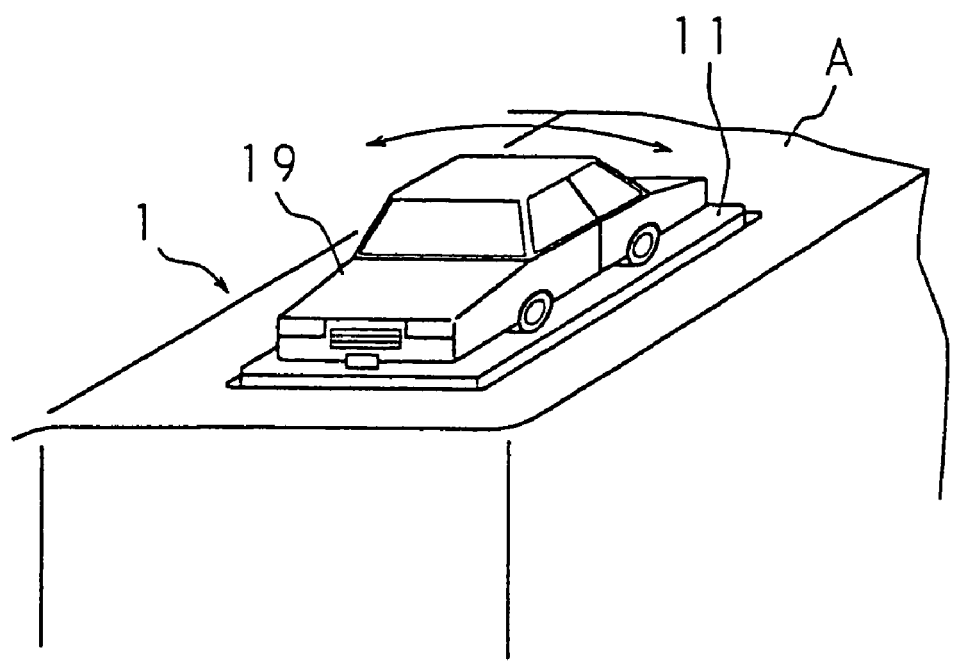

STEERING APPARATUS FOR VEHICLE

This nonprovisional application claims priority under 35 U.S.C. § 119(a) on Patent Application No. 2002-099170 filed in JAPAN on Apr. 1, 2002, which is herein incorporated by reference.

BACKGROUND OF THE INVENTION

1. Field of the Invention

The present invention relates to a steering apparatus for a vehicle, which is used for steering the vehicle in accordance with steering operations performed on steering means by a driver.

2. Description of Related Art

A vehicle is steered by transmitting steering operations performed on steering means by a driver in the passenger's room to a steering mechanism disposed outside the passenger's room so as to turn tire wheels for steering (right and left front wheels, in general) by movement of the steering mechanism.

Recently proposed as one of steering apparatuses for achieving such steering in Japanese Patent Application Laid-Open No. 10-218000 (1998) by the present applicant is a steering apparatus of separate type, or of what is called steer-by-wire type, wherein steering means in the passenger's room is provided mechanically separately from a steering mechanism at the outside of the passenger's room. In the steering apparatus of separate type, an actuator for steering, which is attached to a part of the steering mechanism, is moved on the basis of detection results of an operation direction and an operation amount of the steering means, realizing steering according to steering operations performed on the steering means.

The steering apparatus of separate type has advantages that correspondence between the steering amount of the steering means and the movement amount of the actuator, or what is called a steering transfer ratio, can be set freely without mechanical limit and that steering characteristics can be controlled and changed flexibly in response to a running state such as a vehicle speed, a swing speed and existence of change in speed. It should be noted that an electric motor is widely used as the actuator on account of the easiness to control and change the steering characteristics.

The aforementioned steering apparatus of separate type has advantages that no limit exists in the structure and arrangement of the steering means and that suitable steering means to be used can be selected. However, many of the conventionally proposed steering apparatuses of separate type, including the steering apparatus disclosed in Japanese Patent Application Laid-Open No. 10-218000, employ steering means (which is hereinafter referred to as steering-wheel-shaped steering means) formed in imitation of a steering wheel which is generally used in a steering apparatus of non-separate type.

In a steering apparatus of non-separate type, a ring-shaped steering wheel is attached to one end of a column shaft mechanically connected with a steering mechanism and a turn of the column shaft according to a turning operation of the steering wheel is mechanically transmitted to the steering mechanism, realizing steering by movement of the steering mechanism according to the transmission. It should be noted that a steering apparatus configured as a power steering apparatus provided with an actuator aiming at reduction of driver's load is in practical use, the actuator being driven to apply steer-assisting force to a steering mechanism on the basis of a detection result of the steering torque which is applied to the column shaft by steering operations performed on the steering wheel.

The steering-wheel-shaped steering means employed in the steering apparatus of separate type, which is provided with a ring member fixed on one end of a turning shaft mechanically separated from the steering mechanism, detects the turning direction and turning amount of the turning shaft due to the turning operation of the ring member and moves the actuator for steering attached to the steering mechanism on the basis of the detection result. It should be noted that a reaction force motor is attached to the middle portion of the turning shaft as reaction force applying means. Turning force of the reaction force motor is transmitted to the turning shaft via reduction means to perform the turning operation of the ring member against the turning force, allowing the driver to feel reaction force against steering which is practically applied to the steering mechanism.

The steering apparatus of separate type provided with the aforementioned steering means has an advantage of providing the same feeling in steering as the steering apparatus of non-separate type, however, has a problem that the load put on the driver by repeated steering is large and occurrence of tiredness after driving for a long time is unavoidable since steering of such steering means requires a large operation amount. Furthermore, there arises another problem that a physically handicapped driver meets difficulties in steering of such a steering apparatus.

BRIEF SUMMARY OF THE INVENTION

The present invention has been made with the aim of solving the above problems, and it is an object thereof to provide a steering apparatus for a vehicle which is provided with steering means capable of decreasing a load in steering, reducing tiredness in driving and realizing easy steering operations for physically handicapped drivers, taking advantage of a steering apparatus of separate type that no limit exists in the structure and arrangement of the steering means.

A steering apparatus for a vehicle according to the present invention comprises steering means mechanically separated from a steering mechanism of the vehicle and moves the steering mechanism on the basis of detection results of an operation direction and an operation amount of the steering means. In this steering apparatus for a vehicle, the steering means includes a plate-shaped or rod-shaped operation member which is supported so as to freely swing with a center portion thereof being fixed and detecting means for detecting a swing direction and a swing angle of the operation member respectively as the operation direction and the operation amount.

In this steering apparatus for a vehicle, the steering means may further include a first shaft projected from a part of the body of the vehicle, a second shaft, which is coupled with the first shaft so as to be shifted with regard to the first shaft, for supporting the operation member and a displacement detector for detecting a displacement direction and a displacement amount of the second shaft. In this case, the steering mechanism operates on the basis of the swing direction and the swing angle of the operation member detected by the detecting means and the displacement direction and the displacement amount of the second shaft detected by the displacement detector.

Moreover, in this steering apparatus for a vehicle, the steering means may further include a supporting shaft, which is projected from a part of the body of the vehicle, for supporting the operation member so as to be rotated on a center axis thereof and a rotation detector for detecting a rotation direction and a rotation amount of the operation member. In this case, the steering mechanism operates on the basis of the swing direction and the swing angle of the operation member detected by the detecting means and the rotation direction and the rotation amount of the operation member detected by the rotation detector.

With this steering apparatus for a vehicle, steering is achieved by detecting a swing direction and a swing angle of a plate-shaped or rod-shaped operation member which is operated to swing with a center portion thereof being fixed and moving the steering mechanism in the detected direction in accordance with the detected swing angle. Since a swinging operation of the operation member is easy and requires a small operation amount, a load in steering can be decreased and tiredness in driving can be reduced. Furthermore, such a steering apparatus can provide physically handicapped drivers with opportunities of driving. The operation member may be disposed in a suitable position in the passenger's room, such as on the front face of the dashboard, on the upper face of the armrest, at the lower portion of the seat or at the space around driver's feet, allowing the driver to operate the member in a comfortable position.

In another steering apparatus for a vehicle according to the present invention, the steering means includes an operation member which is supported so as to be freely displaced along a linear displacement pathway and detecting means for detecting a displacement direction and a displacement amount of the operation member respectively as the operation direction and the operation amount.

With this steering apparatus for a vehicle, steering is achieved by detecting a displacement direction and a displacement amount of the operation member which is displaced linearly and moving the steering mechanism in the detected direction in accordance with the detected displacement amount. Since a displacement operation of the operation member is easy and requires a small operation amount, a load in steering can be decreased and tiredness in driving can be reduced. Furthermore, such a steering apparatus can provide physically handicapped drivers with opportunities of driving. The operation member may be disposed in a suitable position in the passenger's room, such as on the front face of the dashboard or on the upper face of the armrest, allowing the driver to operate the member in a comfortable position.

In another steering apparatus for a vehicle according to the present invention, the steering means includes a pair of grip members which are arranged in correspondence to operation directions respectively, and detecting means for detecting strengths of grip forces applied to the grip members as operation amounts in operation directions corresponding to the respective grip members.

With this steering apparatus for a vehicle, steering is achieved by detecting strengths of grip forces applied to a pair of grip members which are arranged in correspondence to right and left operation directions respectively, and moving the steering mechanism in directions corresponding to the respective grip members in accordance with the strengths of the detected grip forces. Since gripping of the grip members is easy and requires a small operation amount, a load in steering can be decreased and tiredness in driving can be reduced. Furthermore, such a steering apparatus can provide physically handicapped drivers with opportunities of driving. The grip members may be disposed in suitable positions in the passenger's room, allowing the driver to grip and operate the member in a comfortable position.

In another steering apparatus for a vehicle according to the present invention, the steering means includes a dial which is supported so as to be rotated on a center axis thereof and detecting means for detecting a rotation direction and a rotation amount of the dial respectively as the operation direction and the operation amount.

With this steering apparatus for a vehicle, steering is achieved by detecting a rotation direction and a rotation amount of the dial which is rotated on a center axis thereof and moving the steering mechanism in the detected direction in accordance with the detected rotation amount. Since a rotation operation of the dial is easy and requires a small operation amount, a load in steering can be decreased and tiredness in driving can be reduced. Furthermore, such a steering apparatus can provide physically handicapped drivers with opportunities of driving. The dial may be disposed in a suitable position in the passenger's room, such as on a part of the steering wheel or on the upper face of the armrest, allowing the driver to steer the vehicle in a comfortable position.

In another steering apparatus for a vehicle according to the present invention, the steering means includes: an operation member formed of a strip-shaped member having end portions supported separately and a U-shaped operation portion between the supported end portions; and detecting means for detecting forces, which are applied to the supported end portions by a pulling operation of the operation member, as operation amounts in directions corresponding to the respective supported end portions.

With this steering apparatus for a vehicle, steering is achieved by detecting forces which are applied to the supported end portions by pulling the U-shaped operation member formed by supporting end portions of a strip-shaped member at a pair of support portions corresponding to the right and left operation directions respectively, and moving the steering mechanism in directions corresponding to the respective supported end portions in accordance with the strengths of the detected forces. Since the pulling operation of the operation member is easy and requires a small operation amount, a load in steering can be decreased and tiredness in driving can be reduced.

The above and further objects and features of the invention will more fully be apparent from the following detailed description with accompanying drawings.

BRIEF DESCRIPTION OF THE SEVERAL VIEWS OF THE DRAWINGS

FIG. 7 is a view for showing the seventh embodiment of steering means provided in a steering apparatus for a vehicle according to the present invention;

DETAILED DESCRIPTION OF THE INVENTION

Figure 1A:
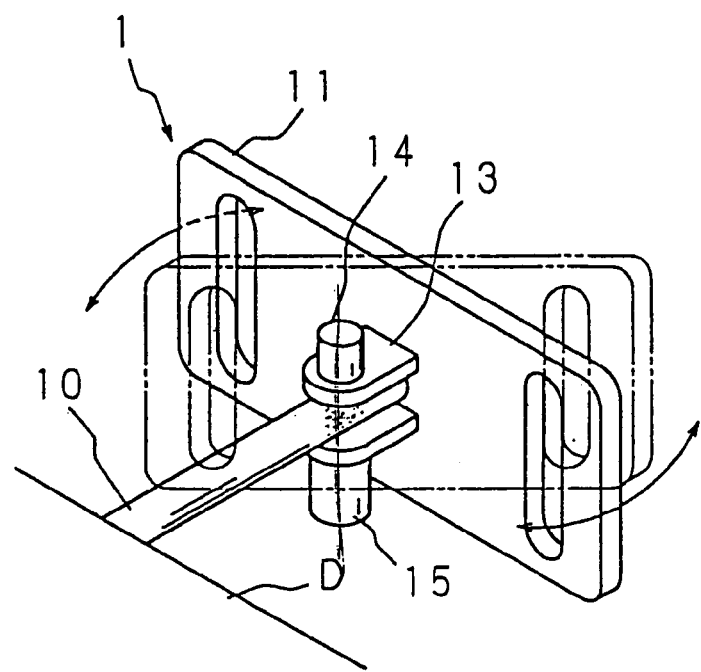
FIGS. 1A and 1B are views for showing the first embodiment of steering means provided in a steering apparatus for a vehicle according to the present invention.
Figure 1B:
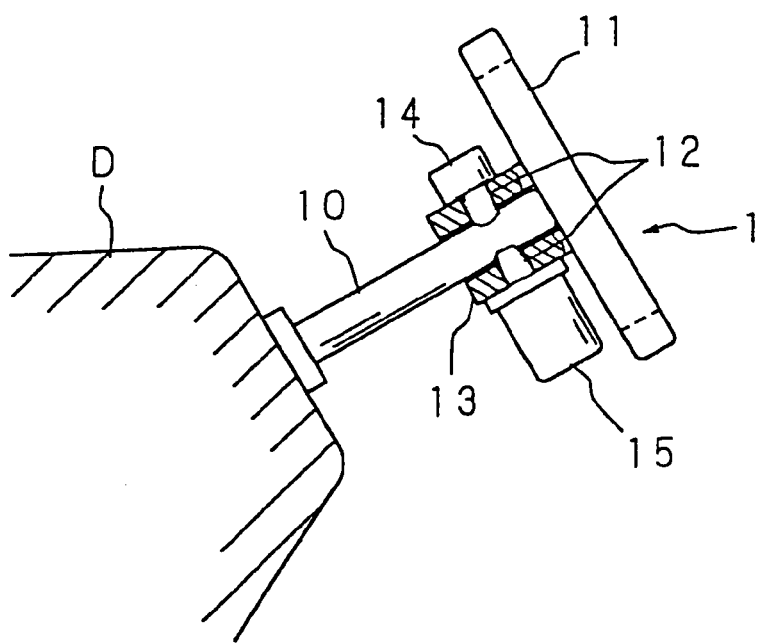

The following description will explain the present invention in detail with reference to the drawings illustrating some embodiments thereof. FIG. 1A is an external perspective view for showing the first embodiment of steering means provided in a steering apparatus for a vehicle according to the present invention. FIG. 1B is a sectional side view of the steering means.

The steering means 1 shown in these figures comprises: a supporting shaft 10 which is projected from a part of the car body, such as the front face of a dashboard D, toward a driver (who is not illustrated in the figures) sitting on the driver's seat in the passenger's room; and a rectangle-plate-shaped operation plate (operation member) 11 supported on one end of the supporting shaft 10. As shown in FIG. 1B, a supporting pin 12 penetrates one end portion of the supporting shaft 10 upward and downward so as to cross the supporting shaft 10 approximately at a right angle. A supporting bracket 13 is provided at an approximately center portion of one face of the operation plate 11. The support of the operation plate 11 on the end of the supporting shaft 10 is achieved by rotatably supporting the supporting bracket 13 at the supporting pin 12 with the longitudinal direction of the operation plate 11 being directed right and left.

The operation plate 11 supported in this manner can freely swing around the axis of the supporting pin 12. A driver who has a seat facing the operation plate 11 and grips right and left edge portions of the operation plate 11 can perform a swinging operation in right and left directions by pushing and pulling the gripped portions. FIG. 1A illustrates in two dotted dash rules a state where the operation plate 11 is made swing by a pushing operation on the right side thereof.

As shown in FIG. 1B, a steering angle sensor 14 and reaction force applying means 15 are attached to a support portion of such an operation plate 11. The aforementioned pushing and pulling operations make the operation plate 11 swing under resistance applied to the support portion by the reaction force applying means 15. The steering angle sensor 14 detects the swing angle as well as the swing direction.

The steering angle sensor 14 is constructed by, for example, attaching a rotational angle detector such as a rotary encoder at the support portion of the operation plate 11 so as to detect a relative angular displacement between the supporting pin 12 and the supporting bracket 13. The reaction force applying means 15 is composed of, for example, a motor attached so as to apply turning force to the support portion of the operation plate 11 and a neutralization spring for applying spring force to the support portion so as to bias the operation plate 11 to a neutral position. Here, the neutral position is a position where the operation plate 11 crosses the supporting shaft 10 approximately at a right angle and does not swing in any direction as illustrated in full lines in FIG. 1A. A driver who performs a swinging operation of the operation plate 11 from the neutral position feels the turning force of the motor and the spring force of the neutralization spring as reaction force against steering.

A steering mechanism, which is not illustrated in the figures, disposed mechanically separately from the steering means 1 detects the operation direction of the motor provided in the reaction force applying means 15 and a reaction force applied from the road surface according to the operation. The motor is controllably driven on the basis of the detection results. The swing direction and the swing angle of the operation plate 11 detected by the steering angle sensor 14 are handled as the direction and the amount of the operation of the operation means 1 performed for steering and are used for controlling an operation of a steering actuator, which is not illustrated in the figures, disposed in the steering mechanism. The control may be performed in control procedures which are disclosed in Japanese Patent Application Laid-Open No. 10-218000 by the present applicant as control procedures for a steering apparatus of separate type having steering-wheel-shaped steering means.

Figure 16:
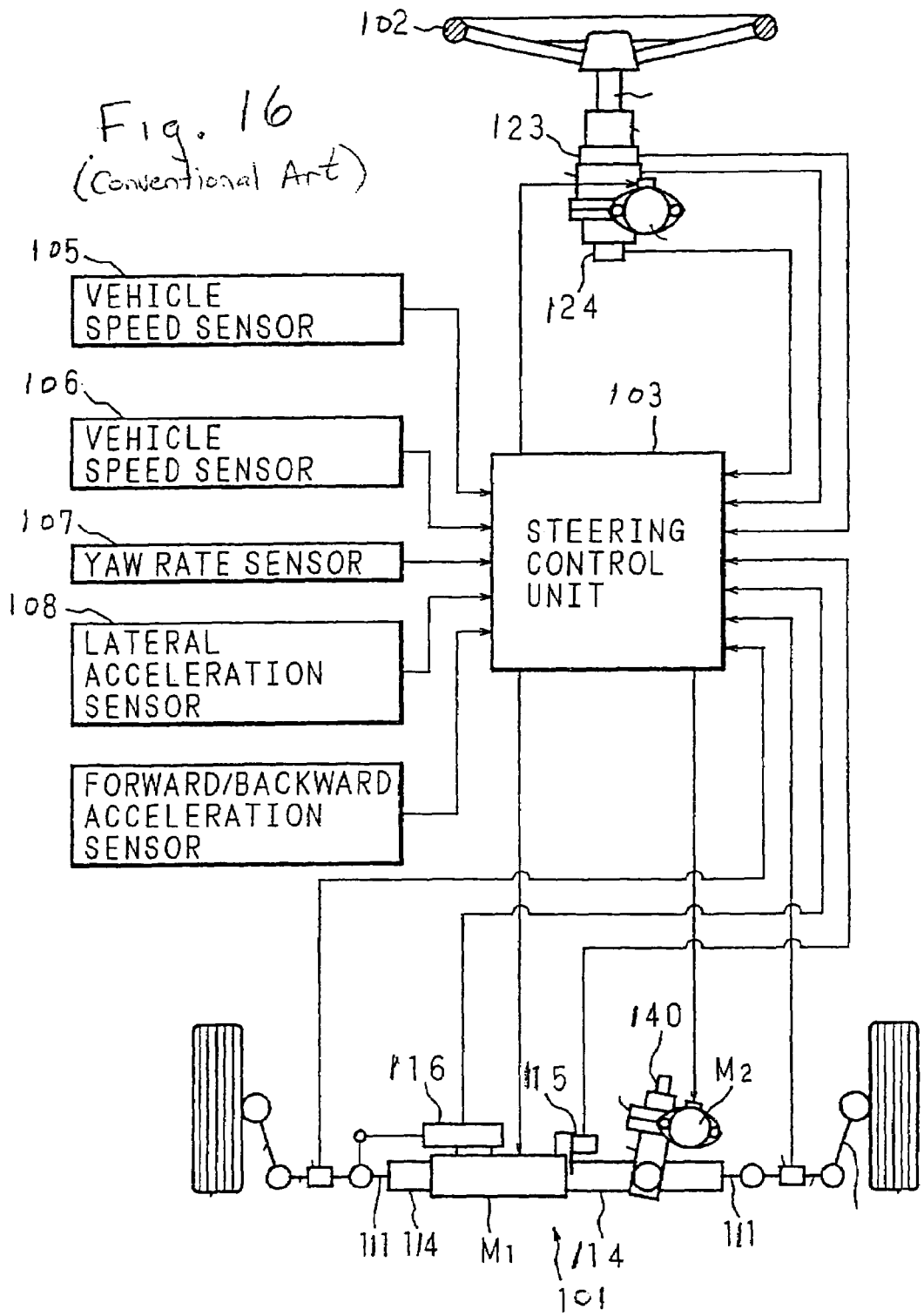
FIG. 16 is a block diagram showing a conventional arrangement of a steering apparatus for automobiles.
Figure 17:
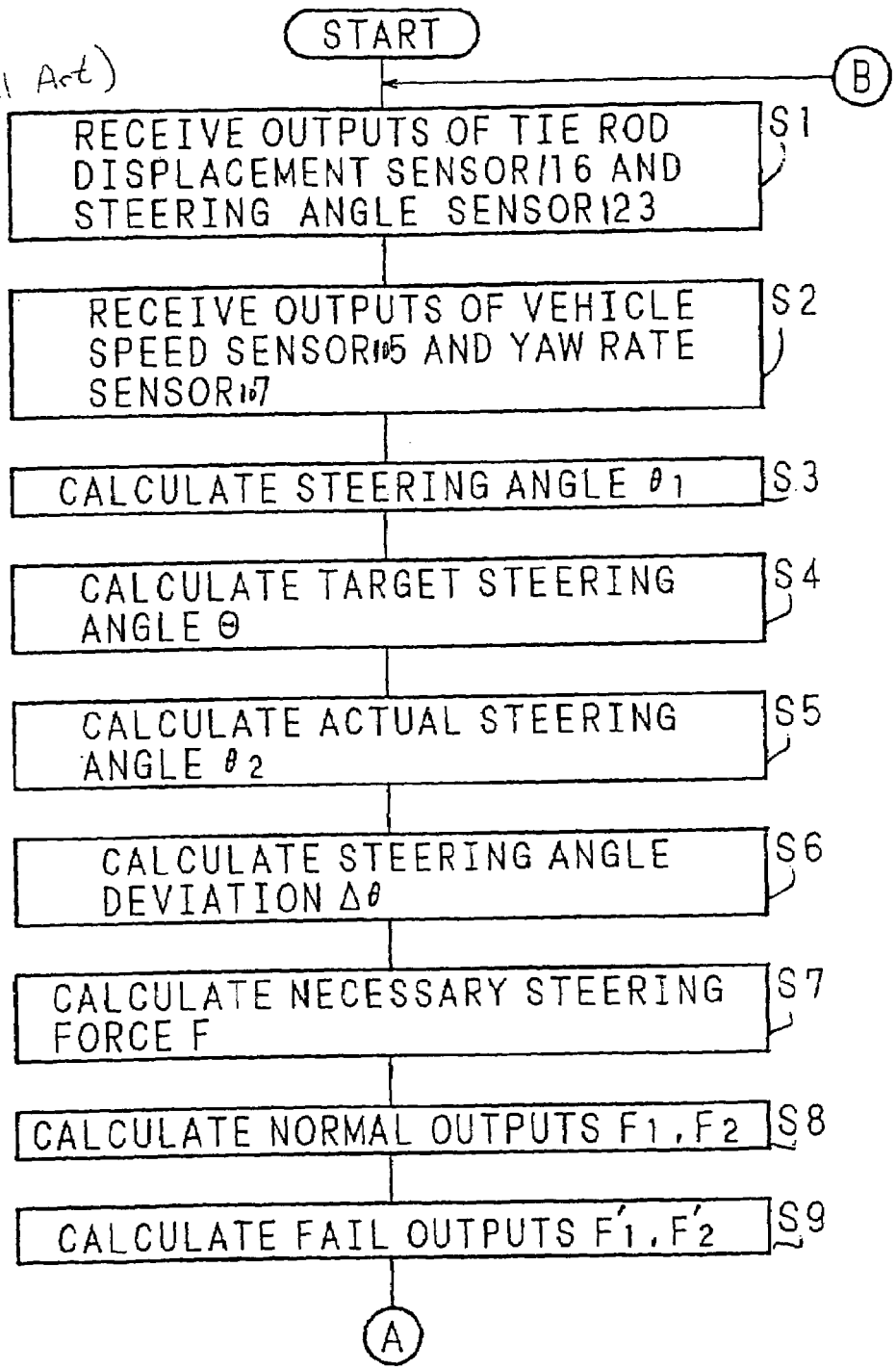
FIG. 17 is a first flow chart illustrating a method of controlling the apparatus of FIG. 16.
Figure 18:
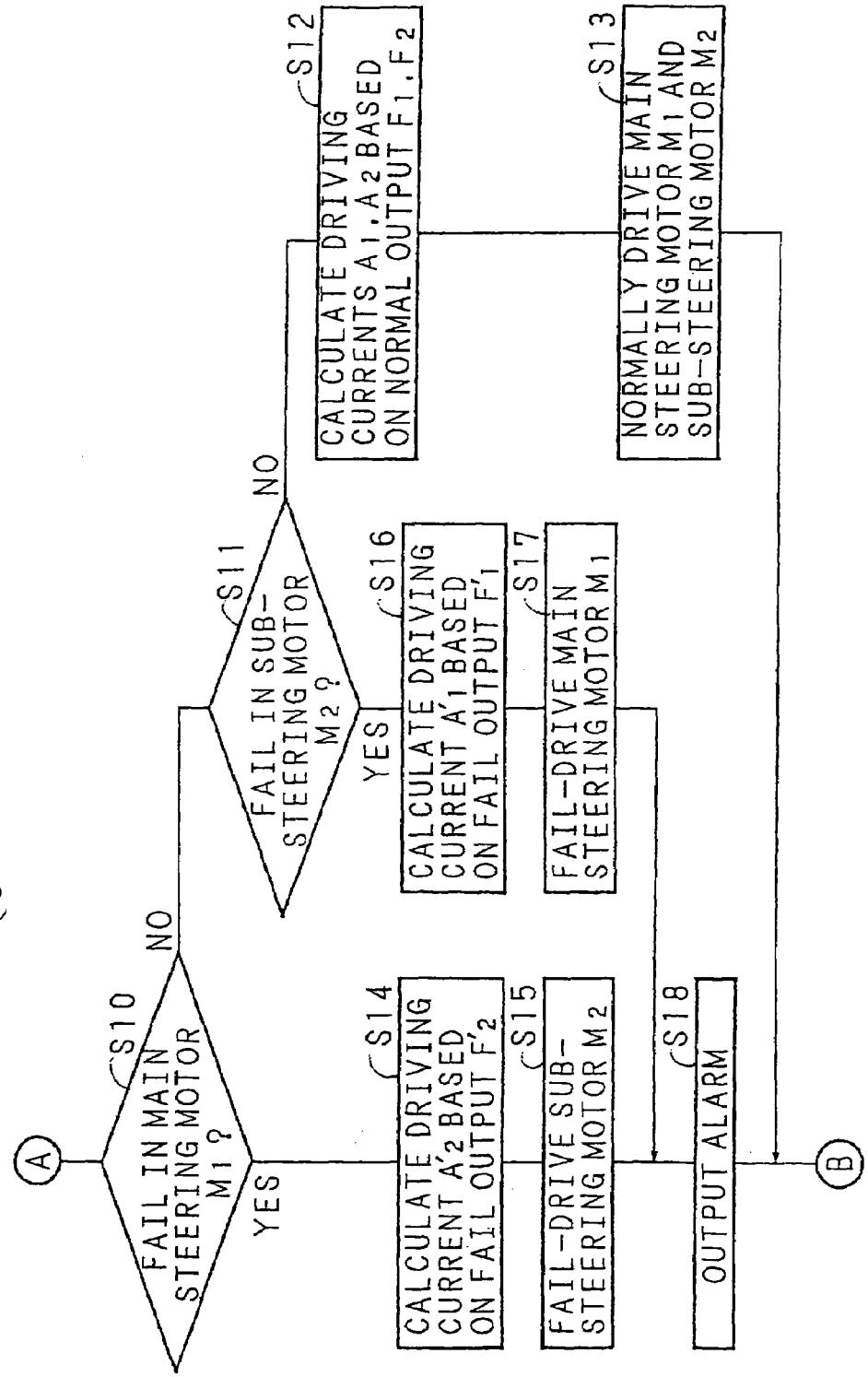
FIG. 18 is a second flow chart illustrating control of the apparatus of FIG. 16.

With reference to FIG. 16, the main steering motor $M_1$ and sub-steering motor $M_2$ are controlled by the steering control unit 103 according to the flow charts in FIGS. 16 and 17. The steering control unit 103 starts its operation according to a key switch on-operation for starting an engine, obtains outputs of the steering angle sensor 123 (or 124) connected to the input side and tie rod displacement sensor 116 with a prescribed sampling period (S1), and obtains outputs of the vehicle speed sensor 105 (or 106) and yaw rate sensor 107 (or lateral acceleration sensor 108) (S2).

Thereafter, the steering control unit 103 calculates the steering angle $\Theta_1$ representing the operating amount of the steering wheel 102 on the basis of the input from the steering angle sensor 123 (S3), and calculates a target steering angle $\Theta$ by applying the obtained steering angle $\Theta_1$ to the following equation (S4).

$$\Theta = K_0 \cdot K_1 \cdot K_2 \cdot \Theta_1 \tag{1}$$

$K_0$ in the equation (1) is a proportionality constant for making the steering angle $\theta_1$ correspond to the target steering angle $\Theta$, and $K_1$ and $K_2$ are correction factors. $K_1$ is the correction factor for changing a steering characteristic according to the vehicle speed, and it is set so as to be smaller during high-speed running in which the vehicle speed exceeds a prescribed speed and to be increased proportionally, for example, according to the lowering of the vehicle speed beneath a predetermined speed, the correction factor is set according to the vehicle speed detected by the vehicle speed sensor 105. On the other hand, $K_2$ is a correction factor for changing a steering characteristic according to the turning state of the car, and it is set according to the actual yaw rate detected by the yaw rate sensor 107 so as to become smaller as the turning degree becomes larger.

Namely, the target steering angle θ obtained at step S4 becomes smaller than the steering angle $\Theta_1$ representing an operating amount of the steering wheel 102 during the high-speed running and becomes larger during the low-speed running, and becomes smaller as the car turns more abruptly.

Alternatively, in the step S4, $K_2$ can be set become larger as the turning degree becomes larger so that the target steering angle Θ becomes larger than the steering angle $\theta_1$ representing the operating amount of the steering wheel 102 as the car turns more abruptly.

Thereafter, the steering control unit 103 calculates the actual steering angle $\theta_2$ generated actually in the steering mechanism 101 on the basis of the input from the tie rod displacement sensor 116 (S5), and calculates a deviation between the actual steering angle $\theta_2$ and target steering angle Θ (a deviation of the steering angle $\Delta\theta=\Theta-\theta_2$) (S6), and obtains a necessary steering force F which is necessary for realizing the target steering angle Θ by the PID calculation based on the deviation of the steering angle Δθ (S7).

Thereafter, the steering control unit 103 distributes the necessary steering force F to the main steering motor $M_1$ and sub-steering motor $M_2$ and obtains normal outputs $F_1$ and $F_2$ corresponding to the respective distributed forces (S8), and further obtains fail outputs $F_1'$ and $F_2'$ which are necessary for the main steering motor $M_1$ and sub-steering motor $M_2$ individually to generate the whole amount of the necessary steering force F (S9).

The necessary steering force F is distributed to the main steering motor $M_1$ and sub-steering motor $M_2$ so that the prescribed ratio previously set of the main steering motor $M_1$ to sub-steering motor $M_2$ becomes 2:1, for example. Moreover, the fail outputs $F_1'$ and $F_2'$ are set to the maximum output to be obtained when maximum rated current is passed in the respective motors as an upper limit.

As mentioned above, after calculating the normal outputs $F_1$ and $F_2$ and fail outputs $F_1'$ and $F_2'$, the steering control unit 103 judges as to whether or not a fail exists in each of the main steering motor $M_1$ and sub-steering motor $M_2$ (S10 and S11). As a result of the judgment, when both the motors are judged to be normal, the steering control unit 103 respectively obtains driving currents $A_1$ and $A_2$ which are necessary for the main steering motor $M_1$ and sub-steering motor $M_2$ to generate the normal outputs $F_1$ and $F_2$ (S12), and outputs them so as to normally drive the main steering motor $M_1$ and sub-steering motor $M_2$ (S13). This operation is repeated until the key switch is turned off.

Here, the input from the rotation angle sensor 115 provided to the main steering motor $M_1$ to the steering control unit 103 is used for recognizing the rotating position of the main steering motor $M_1$ when the driving current $A_1$ is outputted and adjusting a phase of the driving current $A_1$.

According to the aforementioned operations, when the main steering motor $M_1$ and sub-steering motor $M_2$ are in the normally operable state (generally in this state), the necessary steering force F as a combined force of the output $F_1$ for the main steering motor $M_1$ and the output $F_2$ for the sub-steering motor $M_2$ is applied to the steering mechanism 101. Therefore, the main steering motor $M_1$ and sub-steering motor $M_2$ respectively may share the necessary steering force F, so both the motors $M_1$ and $M_2$ can be miniaturized, and thus they can be easily provided to the circumference of the steering mechanism 101.

The main steering motor $M_1$ is structured integrally in the midway portion of the rack housing 114 supporting the rack shaft 111, and it can be arranged without occupying large space in the circumference of the rack shaft 111. Moreover, the sub-steering motor $M_2$ is structured so that the pinion shaft 140 engaged with the midway portion of the rack shaft 111 in the connected-type rack pinion steering apparatus in which the steering mechanism 101 is connected to the steering wheel 102 is used, and a rotation force is applied to the pinion shaft 140.

Therefore, the sub-steering motor $M_2$ can be easily provided in the existing steering mechanism 101.

Here, the structures of the main steering motor $M_1$ and sub-steering motor $M_2$ are not limited to those described in the aforementioned embodiment, so needless to say, another configuration can be adopted. Moreover, in the judgment of the fail in the main steering motor $M_1$ and sub-steering motor $M_2$ at steps S10 and S11, a fail judging method normally used in various motors such that a change with time in driving currents of the motors is monitored may be used. Moreover, in the steps S10, and S11, it can be made to judge the malfunction of the parts including the steering control unit, the driving circuit and the communication means for transmitting information between steering control parts which are related to driving of each motor besides the malfunction judgement of motors.

As a result of the judgment at step S10, when the judgment is made that the main steering motor $M_1$ is in the fail state, the steering control unit 103 obtains a driving current $A_2'$ which is necessary for the sub-steering motor $M_2$ on the non-malfunction side to generate the fail output $F_2'$ (S14), outputs it as the motion instruction to the sub-steering motor $M_2$ so as to fail-drive the sub-steering motor $M_2$ (S15). Alternately, as a result of the judgment at S11, when the judgment is made that the sub-steering motor $M_2$ is in the fail state, the steering control unit 103 obtains the driving current $A_1'$ which is necessary for the main steering motor $M_1$ on the non-malfunction state to generate the fail output $F_1'$ (S16), outputs it as the motion instruction to the main steering motor $M_1$ so as to fail-drive the main steering motor $M_1$ (S17). In these cases, an alarming means connected to the output side is operated so that an alarm is outputted (S18).

In a vehicle comprising the steering means 1 constructed as described above, a driver who sits on the driver's seat can steer the vehicle by gripping the both edges of the operation plate 11 positioned at the front and operating the operation plate 11 to swing in right and left directions. In comparison with a turning operation of a steering wheel generally used as steering means, the swinging operation of such an operation plate 11 is easy and requires a small operation amount, and thereby a load in steering can be decreased and tiredness in driving for a long time can be reduced. Furthermore, such a steering apparatus can provide physically handicapped drivers with opportunities of driving.

It should be noted that, although the above explanation has described a case where the steering means 1 shown in FIGS. 1A and 1B is solely provided, the steering means 1 may be provided for assisting the steering-wheel-shaped steering means and used, for example, only for steering at a relatively small angle during a drive on open roads or the like.

Figure 2A:
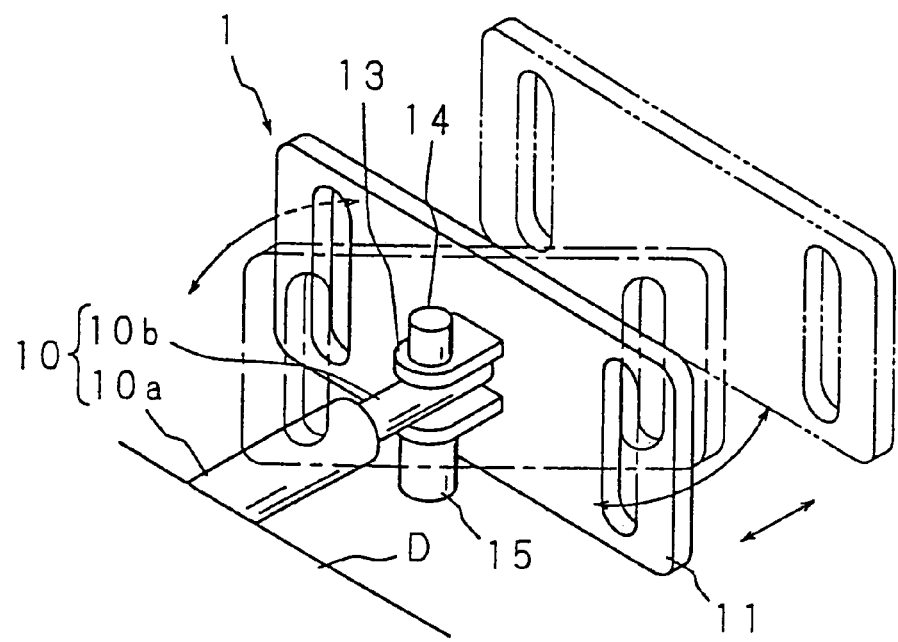
FIGS. 2A and 2B are views for showing the second embodiment of steering means provided in a steering apparatus for a vehicle according to the present invention.
Figure 2B:
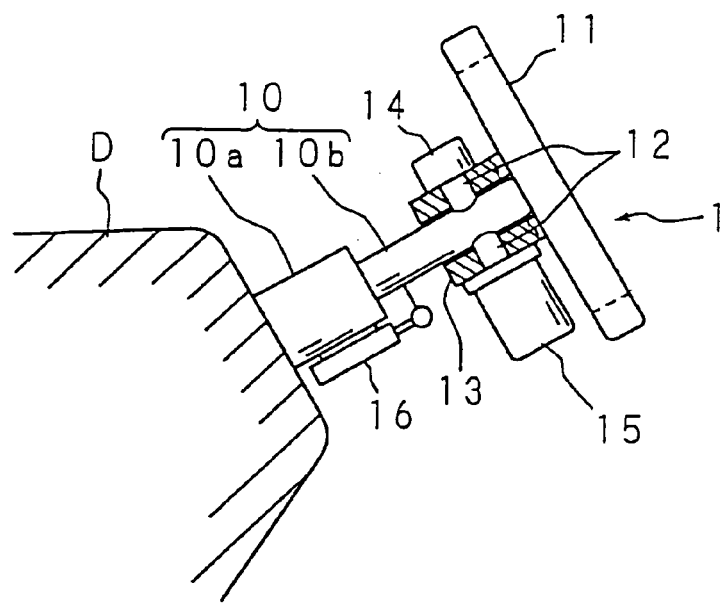

FIG. 2A is an external perspective view for showing the second embodiment of steering means provided in a steering apparatus for a vehicle according to the present invention. FIG. 2B is a sectional side view of the steering means. The steering means 1 comprises, similarly to the steering means 1 shown in FIGS. 1A and 1B, a supporting shaft 10 which is projected from the front face of a dashboard D and an operation plate 11 which is supported on one end of the supporting shaft 10 at the approximately center portion thereof so as to swing right and left. The steering means 1 achieves steering by detecting, with a steering angle sensor 14, the swing direction and the swing angle of the operation plate 11 under reaction force applied by the reaction force applying means 15 and moving the steering actuator attached to the steering mechanism on the basis of the detection result. Since the support structure of the operation plate 11 and the structures and operations of the steering angle sensor 14 and the reaction force applying means 15 are the same as those of the first embodiment shown in FIGS. 1A and 1B, detailed description thereof is omitted.

The feature of this embodiment lies in that the supporting shaft 10 is composed of a hollow lower shaft 10*a* and an upper shaft 10*b* for supporting the operation plate 11 which are coupled with each other in a telescopic manner so that a driver gripping the operation plate 11 can perform swinging operations of the operation plate 11 in right and left directions as well as pushing and pulling operations of the operation plate 11 in an axial direction of the supporting shaft 10 associated with telescopic motion of the lower shaft 10*a* and the upper shaft 10*b*. The amount of each operation is detected by a displacement sensor 16 which is interposed between the lower shaft 10*a* and the upper shaft 10*b* as schematically shown in FIG. 2B. FIG. 2A illustrates in two dotted dash rules a state where the operation plate 11 is pulled out, illustrates in full lines a state where the operation plate 11 is pushed in and illustrates in one dotted dash rules a state where the operation plate 11 is made to swing by a pushing operation at the right side at the pushed-in position.

The detection result of the displacement sensor 16 can be used, for example, for controlling the correspondence between the amount of swinging operation of the operation plate 11 and the movement amount of the steering actuator, or what is called a transfer ratio of steering. In this case, a wide variety of steering forms can be provided including an example wherein a large scale steering is performed by a combination of a push-in operation and a swinging operation of the operation plate 11 while a small scale steering is performed by a combination of a pull-out operation and a swinging operation.

Moreover, the detection result of the displacement sensor 16 can be used, for example, for controlling increase and decrease of running speed by using the push-in operation as an acceleration operation and the pull-out operation as a brake operation. In this case, approximately the whole of the operations for driving a vehicle can be provided by the combination of swinging operations and pushing and pulling operations of the operation plate 11.

Figure 3A:
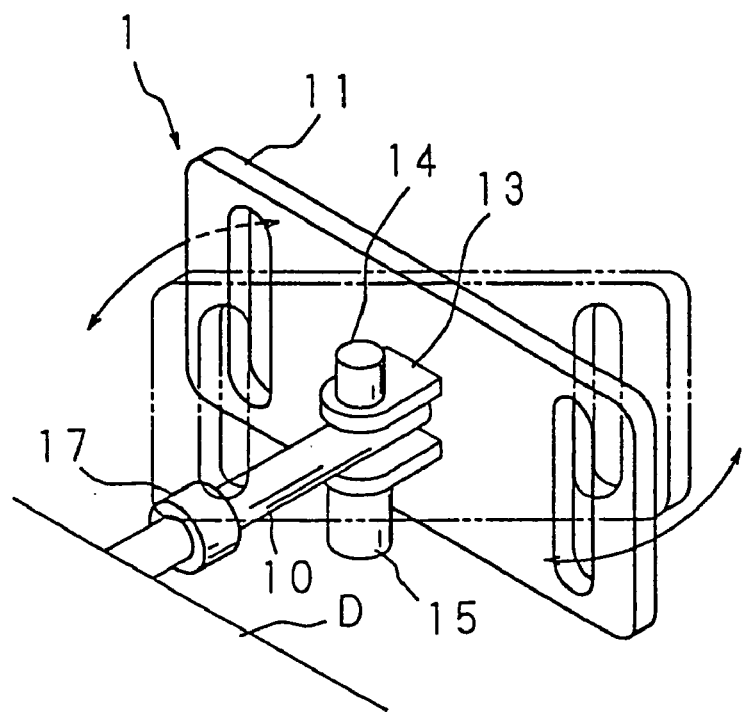
FIGS. 3A and 3B are views for showing the third embodiment of steering means provided in a steering apparatus for a vehicle according to the present invention.
Figure 3B:
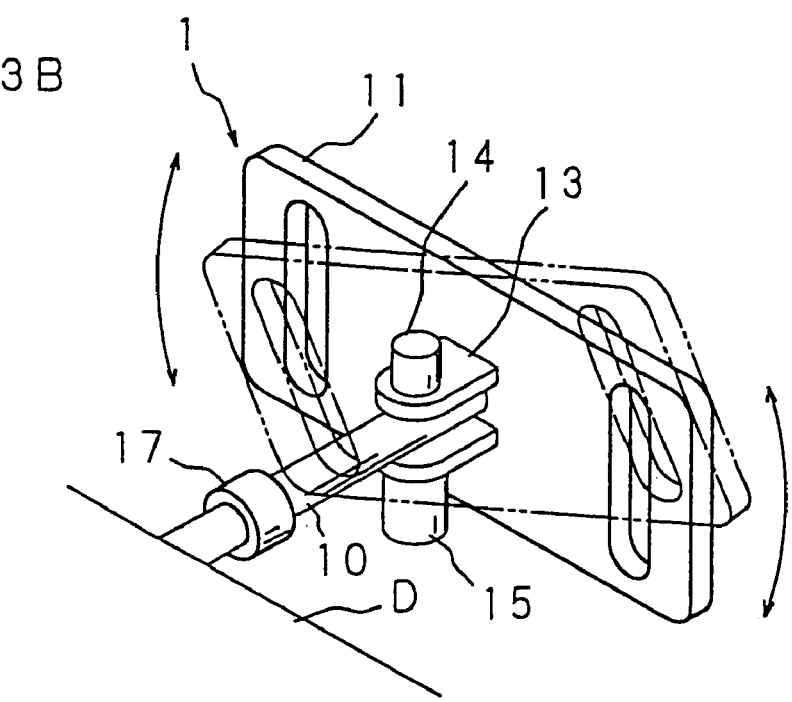

FIG. 3A is an external perspective view for showing the third embodiment of steering means provided in a steering apparatus for a vehicle according to the present invention. FIG. 3B is a sectional side view of the steering means. The steering means 1 shown in these figures comprises, similarly to the steering means 1 shown in FIGS. 1A and 1B, a supporting shaft 10 which is projected from the front face of a dashboard D and an operation plate 11 which is supported on one end of the supporting shaft 10 at the approximately center portion thereof so as to be swing in right and left directions. The steering means 1 achieves steering by detecting, with a steering angle sensor 14, the swing direction and the swing angle of the operation plate 11 under reaction force applied by the reaction force applying means 15 and moving the steering actuator attached to the steering mechanism on the basis of the detection result. Since the support structure of the operation plate 11 on the end of the supporting shaft 10 and the structures and operations of the steering angle sensor 14 and the reaction force applying means 15 are the same as those of the first embodiment shown in FIGS. 1A and 1B, detailed description thereof is omitted.

The feature of this embodiment lies in that the supporting shaft 10 is supported so as to freely turn on an axis thereof so that a driver gripping the operation plate 11 can perform turning operations of the operation plate 11 with the supporting shaft 10 in addition to the swinging operations of the operation plate 11 in right and left directions. FIG. 3A illustrates in two dotted dash rules a state where the operation plate 11 is made swing by a pushing operation at the right side thereof while FIG. 3B illustrates in two dotted dash rules a state where a turning operation is performed on the operation plate 11.

A rotational angle sensor 17 attached to the middle portion of the supporting shaft 10 detects the amount of such a turning operation of the operation plate 11 as well as the turning direction. The detection result can be used for controlling an operation of the steering actuator, similarly to the detection result of the steering angle sensor 14, so that a large scale steering is performed by a turning operation and a small scale steering is performed by a swinging operation. Moreover, similarly to the second embodiment, the detection result of the rotational angle sensor 17 can be used for controlling the correspondence between the amount of swinging operation of the operation plate 11 and the movement amount of the steering actuator, or what is called a transfer ratio of steering, so that a large scale steering is performed by a combination of a turning operation in the same direction and a turning operation and a small scale steering is performed only by a swinging operation. In these manners, a wide variety of steering forms can be provided.

Figure 4A:
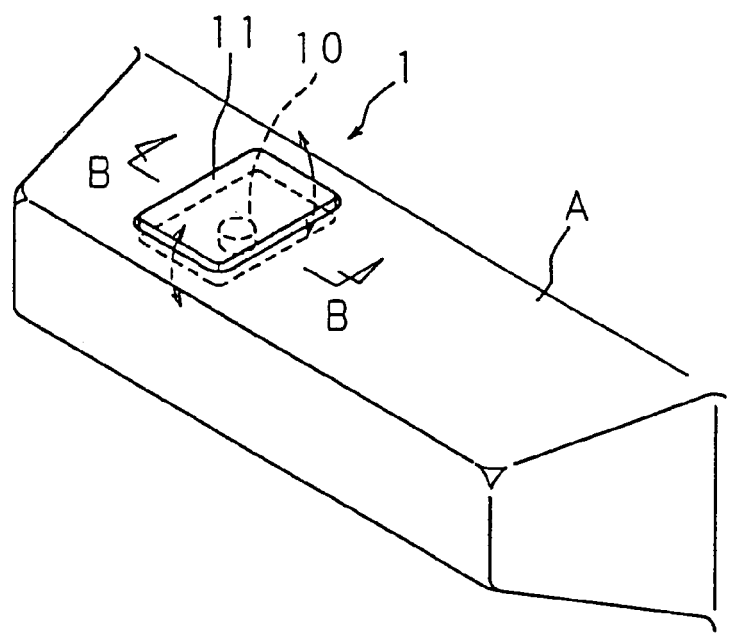
FIGS. 4A and 4B are views for showing the fourth embodiment of steering means provided in a steering apparatus for a vehicle according to the present invention.
Figure 4B:
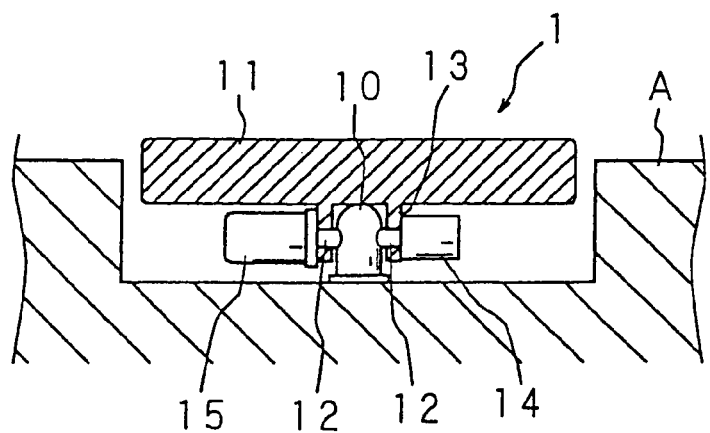

FIG. 4A is an external perspective view for showing the fourth embodiment of steering means provided in a steering apparatus for a vehicle according to the present invention. FIG. 4B is a sectional side view taken along the line B—B in FIG. 4A.

The steering means 1 shown in these figures comprises a supporting shaft 10 which stands approximately vertically on the upper face of an armrest A provided on the inner face of a side door which is not illustrated in the figures and a rectangle-plate-shaped operation plate (operation member) 11 which is supported on one end of the supporting shaft 10. As shown in FIG. 4B, a supporting pin 12 penetrates one end portion of the supporting shaft 10 backward and forward so as to cross the supporting shaft 10 approximately at a right angle. A supporting bracket 13 is provided on an approximately center portion of one face of the operation plate 11. The support of the operation plate 11 on the end of the supporting shaft 10 is achieved by rotatably supporting the supporting bracket 13 at the supporting pin 12. The operation plate 11 supported in this manner can be operated to swing around the axis of the supporting pin 12 in right and left directions as indicated by arrows in FIG. 4A.

As shown in FIG. 4B, a steering angle sensor 14 and reaction force applying means 15 are attached at a support portion of the operation plate 11. The aforementioned swinging operations of the operation plate 11 are performed under resistance applied to the support portion by the reaction force applying means 15. The steering angle sensor 14 detects the swing angle as well as the swing direction. The structures and operations of the steering angle sensor 14 and the reaction force applying means 15 are the same as those of the first embodiment shown in FIGS. 1A and 1B, and the detailed description thereof is omitted. It should be noted that FIG. 4A illustrates only the position of the supporting shaft 10 at the rear face of the operation plate 11 and the supporting pin 12, supporting bracket 13, steering angle sensor 14 and reaction force applying means 15 are omitted in this figure.

In a vehicle provided with the steering means 1 constructed in this manner, a driver who sits on the driver's seat can perform a desired steering by operating the operation plate 11 to swing right and left with his arm laid on the armrest A and with his palm put on the upper face of the operation plate 11. Since such a swinging operation of the operation plate 11 is easy and requires a small operation amount in comparison with a turning operation of a steering-wheel-shaped steering means generally used, a load in steering can be decreased and tiredness in driving can be reduced. Moreover, such a steering apparatus can provide physically handicapped drivers with opportunities of driving. Further more, with this embodiment wherein the driver sitting on the driver's seat can steer the vehicle in a comfortable position with his arm laid on the armrest A as mentioned above, tiredness in driving can be further reduced.

Figure 5:
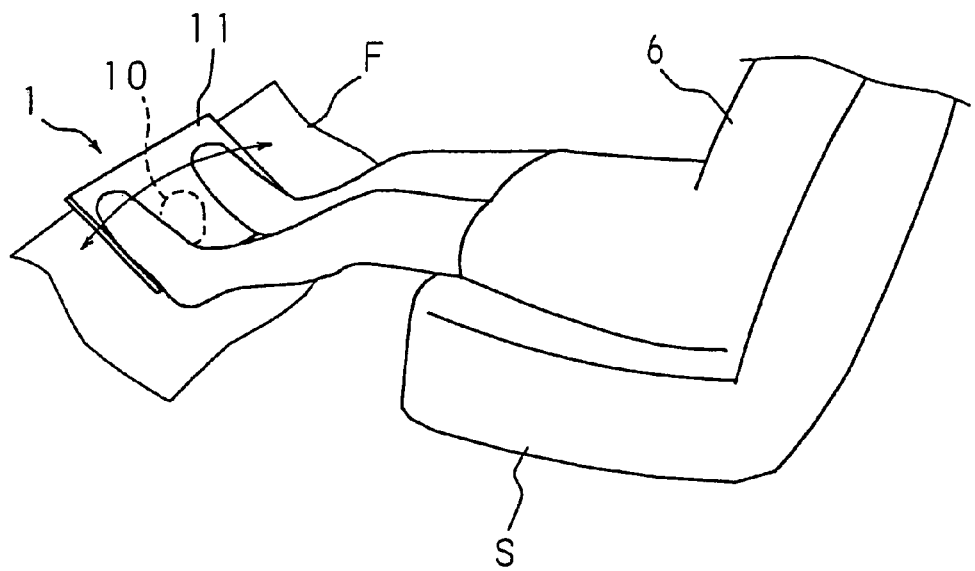
FIG. 5 is a view for showing the fifth embodiment of steering means provided in a steering apparatus for a vehicle according to the present invention.

FIG. 5 is a view for showing the fifth embodiment of steering means provided in a steering apparatus for a vehicle according to the present invention. The steering means 1 shown in the figure comprises a supporting shaft 10 which is positioned under driver's feet and stands approximately vertically from a floor F of the passenger's room and an operation plate 11 which is supported on one end of the supporting shaft 10 at the center portion thereof so as to swing in right and left directions. The steering means 1 achieves steering by moving a steering actuator attached to the steering mechanism on the basis of detection results of the swing direction and the swing angle of the operation plate 11. Since the support structure of the operation plate 11 and the structures and operations of the steering angle sensor for detecting the swing angle of the operation plate 11 and the reaction force applying means for applying reaction force to the operation plate 11 are the same as those of the first embodiment shown in FIGS. 1A and 1B, detailed description thereof is omitted.

With this embodiment wherein the operation plate 11 is disposed on the floor F of the passenger's room under driver's feet, a driver 6 sitting on a seat S can place his feet on right and left end portions of the operation plate 11 and operate the operation plate 11 to swing by applying pressure by stepping on the plate as shown in the figure so as to perform desired steering in respective directions by the swinging operations. Since such a swinging operation of the operation plate 11 is easy and requires a small operation amount in comparison with a turning operation of a steering-wheel-shaped steering means generally used, a load in steering can be decreased and tiredness in driving can be reduced.

Figure 6:
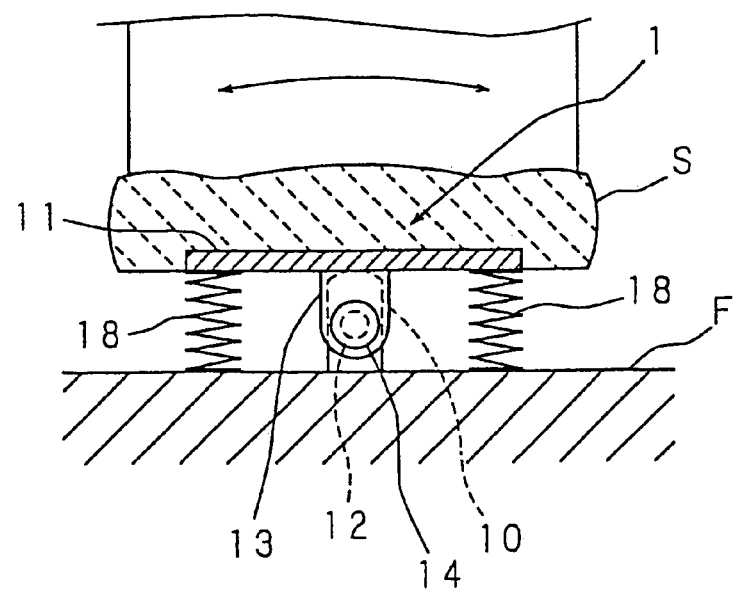
FIG. 6 is a view for showing the sixth embodiment of steering means provided in a steering apparatus for a vehicle according to the present invention.

FIG. 6 is a view for showing the sixth embodiment of steering means provided in a steering apparatus for a vehicle according to the present invention. FIG. 7 is a view for showing the seventh embodiment of the same.

The steering means 1 shown in FIG. 6 is constructed by supporting an operation plate 11 having a large volume at one end of a supporting shaft 10 standing on a floor F of the passenger's room and attaching a seat S, on which a driver is to sit, with the operation plate 11 functioning as a supporting base. The driver sitting on the seat S performs a desired steering in respective directions by making the operation plate 11 swing in accordance with his weight shifted to the right and the left. With such a construction, the driver can steer the vehicle having the same feeling as that of steering a two-wheeled vehicle, a load in steering can be decreased and tiredness in driving can be reduced.

Neutralization springs 18 are interposed respectively between the right side of the operation plate 11 and the floor F and between the left side of the operation plate 11 and the floor F. The operation plate 11 is constructed to swing right and left against spring force applied by the neutralization springs 18. Since the structures and operations of other portions, such as the support portion of the operation plate 11 and the steering angle sensor 14 for detecting the swing angle of the operation plate 11, are the same as those of the first embodiment shown in FIGS. 1A and 1B, detailed description thereof is omitted.

Similarly to the steering means 1 shown in FIGS. 4A and 4B, the steering means 1 shown in FIG. 7 is constructed by supporting the operation plate 11 at one end of a supporting shaft (which is not illustrated in the figure) standing on the upper face of the armrest A and fixing a model 19 of a car on the upper face of the operation plate 11. With this structure, a desired steering partly for pleasure can be performed in respective directions by gripping the model 19 of a car and operating the operation plate 11 to swing right and left, so that a load in steering can be decreased and tiredness in driving can be reduced. It should be noted that this figure shows a perspective view of the structure from the front side of the vehicle, i.e., in the opposite direction to FIG. 4A.

In the structures shown in FIGS. 5 through 7, the operation plate 11 may also be supported so as to swing backward and forward or to be turned on the supporting shaft as well as to swing right and left. In this case, a wide variety of steering forms can be provided using a combination of a swinging operation in backward and forward directions and a swinging operation in right and left directions or a combination of a swinging operation and a turning operation.

Figure 8A:
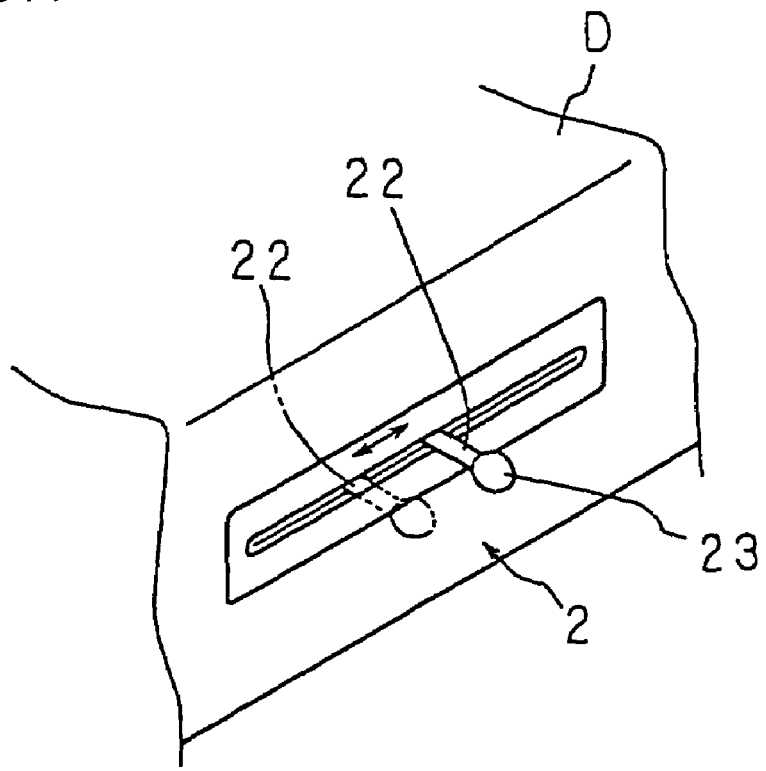
FIGS. 8A and 8B are views for showing the eighth embodiment of steering means provided in a steering apparatus for a vehicle according to the present invention.
Figure 8B:
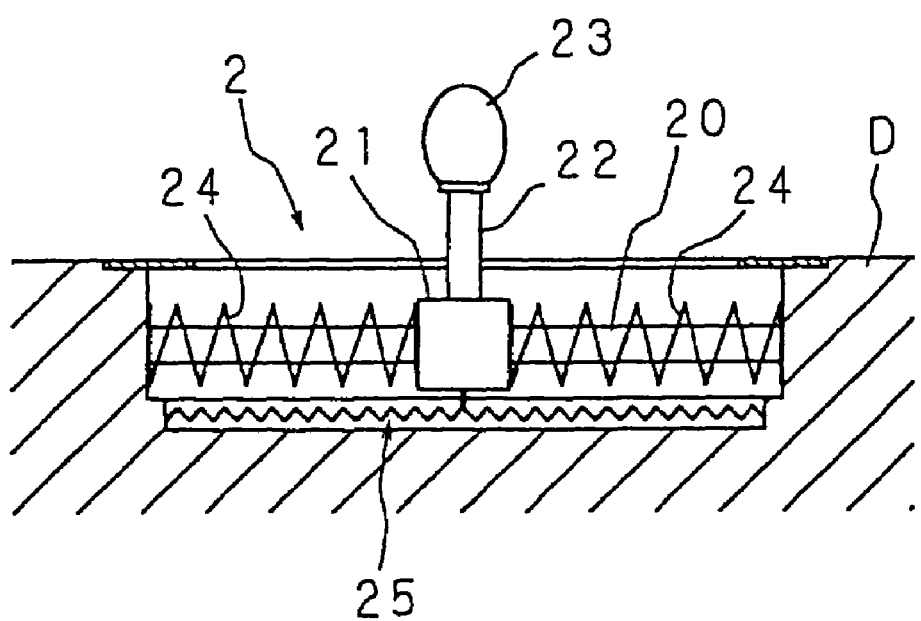

As shown in FIG. 8B, the slider 21 is biased toward a center portion of the guiding member 20 respectively by a pair of neutralization springs, which are in a resilient contact with both sides of the slider 21, to be positioned at a neutral position where spring forces of these neutralization springs 24 counterbalance each other, i.e., at a longitudinal center position of the guiding member 20. The operation lever 22 constructed in this manner can be shifted in the longitudinal direction of the guiding member 20, i.e. in right and left directions of the vehicle, against spring force applied by the neutralization springs 24 as the slider 21 slides. FIG. 8A illustrates in two dotted dash lines the operation lever 22 which is shifted toward the left side.

As shown in FIG. 8B, the slider 21 is biased toward a center portion of the guiding member 20 respectively by a pair of neutralization springs, which are in a resilient contact with both sides of the slider 21, to be positioned at a neutral position where spring forces of these neutralization springs 24 counterbalance each other, i.e., at a longitudinal center position of the guiding member 20. The operation lever 22 constructed in this manner can be shifted in the longitudinal direction of the guiding member 20, i.e. in right and left directions of the vehicle, against spring force applied by the neutralization springs 24 as the slider 21 slides. FIG. 8A illustrates in two dotted dash rules the operation lever 22 which is shifted toward the left side.

As schematically shown in the figure, a displacement sensor 25 configured as a linear potentiometer detects the displacement position of the operation lever 22 which can be displaced as described above as well as the displacement direction. The detected position is handled as the direction and amount of the operation of the steering means 2 performed for steering and used for controlling an operation of a steering actuator disposed in a steering mechanism which is not illustrated in the figure. The control may be performed in control procedures which are disclosed in Japanese Patent Application Laid-Open No. 10-218000 by the present applicant as control procedures for a steering apparatus of separate type having steering-wheel-shaped steering means.

In a vehicle provided with the steering means 2 constructed in this manner, a driver who sits on the driver's seat can steer the vehicle by gripping the grip 23 provided at one end of the operation lever 22 which is positioned at the front and displacing the operation lever 22 in right and left directions. Since such a displacement operation of the operation lever 22 is easy and requires a small operation amount in comparison with a turning operation of steering-wheel-shaped steering means generally used, a load in steering can be decreased and tiredness in driving for a long time can be reduced. Furthermore, such a steering apparatus can provide physically handicapped drivers with opportunities of driving.

Although the above explanation has described a case where the steering means 2 shown in FIGS. 8A and 8B is solely provided, the steering means 2 may be provided, for example, on a pad portion of a steering wheel which is not illustrated in the figures for assisting the steering-wheel-shaped steering means and used, for example, only for steering at a relatively small angle during a drive on open roads or the like.

The position where the steering means 2 is disposed is not limited to the dashboard D shown in FIGS. 8A and 8B and the steering means 2 may be disposed in a suitable position, such as on the upper face of the armrest A shown in FIGS. 4A and 4B, as long as the driver can operate the steering means 2.

Figure 9A:
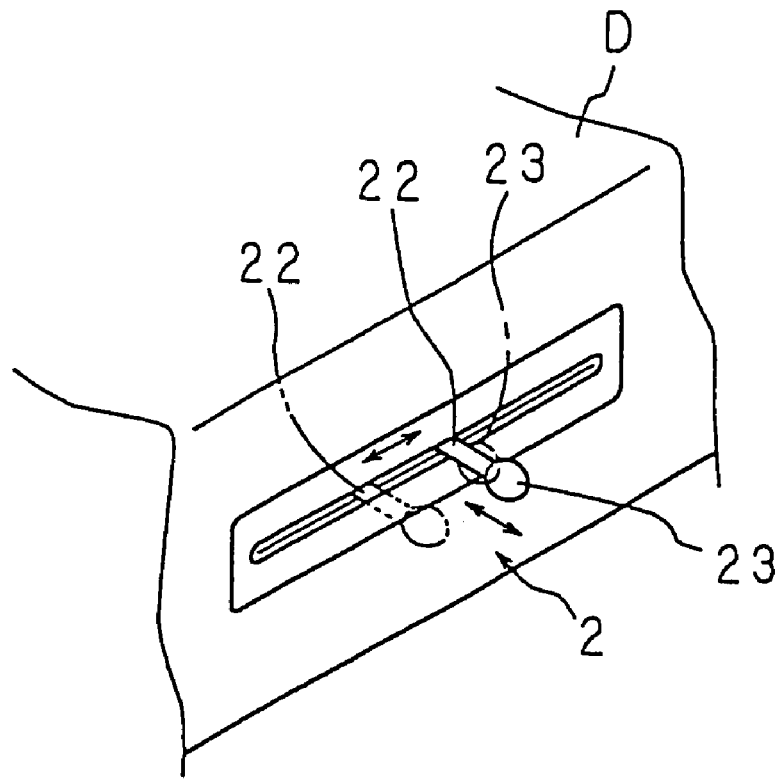
FIGS. 9A and 9B are views for showing the ninth embodiment of steering means provided in a steering apparatus for a vehicle according to the present invention.
Figure 9B:
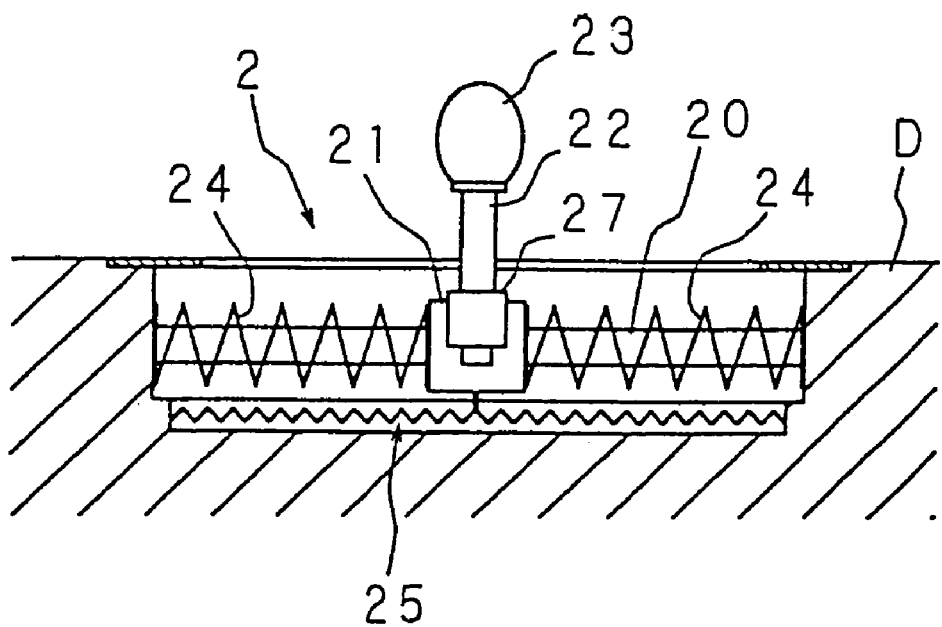
Figure 10A:
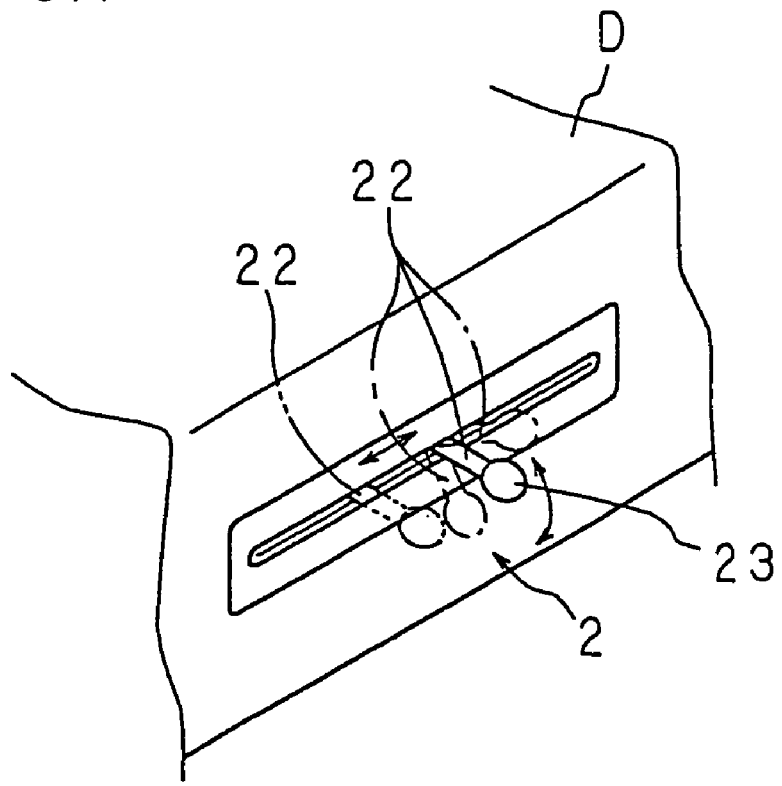
FIGS. 10A and 10B are views for showing the tenth embodiment of steering means provided in a steering apparatus for a vehicle according to the present invention.
Figure 10B:
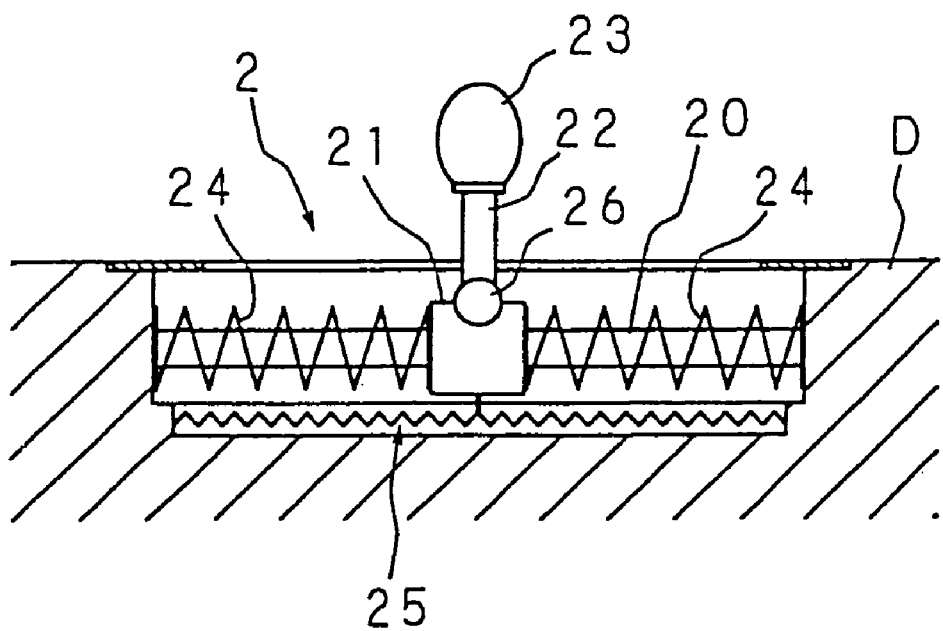

FIG. 9A is an external perspective view for showing the ninth embodiment of steering means provided in a steering apparatus for a vehicle according to the present invention and FIG. 9B is a sectional side view of the steering means. FIG. 10A is an external perspective view for showing the tenth embodiment of steering means provided in a steering apparatus for a vehicle according to the present invention and FIG. 10B is a sectional side view of the steering means. The steering means 2 in these figures, similarly to the steering means 2 shown in FIGS. 8A and 8B, comprises a linear-rod-shaped guiding member 20 extended at a part of the dashboard D in the right and left directions, a slider 21 which is retained on the guiding member 20 so as to freely slide in the longitudinal direction and an operation lever (operation member) 22 having a base supported on the slider 21. A grip 23 is provided on one end of the operation lever 22. Since the support structure of the slider 21 at the guiding member 20, the structures and operations of the neutralization springs 24 and the displacement sensor 25 and the contents of the steering control operation based on the position detected by the displacement sensor 25 are the same as those of the eighth embodiment shown in FIGS. 8A and 8B, detailed description thereof is omitted.

The feature of these embodiments lies in the support structure of the guiding member 20 at the slider 21. The operation lever 22 shown in FIGS. 9A and 9B is inserted into and supported at a sliding bracket 27 provided at the slider 21 so as to slide with respect to the sliding bracket 27 by pushing and pulling operations in the axial direction and to perform a telescopic operation to project from and recede into the slider 21. Such a telescopic operation can be performed between a position illustrated in full lines in FIG. 9A and a position illustrated in one dotted dash rules in the figure. The operation amount is detected by a telescopic motion sensor (which is not illustrated in the figure) interposed between the operation lever 22 and the slider 21.

With this embodiment, a driver gripping the grip 23 can perform a displacement operation of the operation lever 22 along the guiding member 20 as well as a telescopic operation of the operation lever 22 at respective displacement positions. The detection result of the telescopic motion amount of the operation lever 22 detected by the telescopic motion sensor can be used, for example, for controlling the correspondence between the displacement amount of the operation lever 22 and the movement amount of the steering actuator, or what is called a transfer ratio of steering. In this case, a wide variety of steering forms can be provided including an example wherein a large scale steering is performed by a combination of a push-in operation and a displacement operation of the operation lever 22 while a small scale steering is performed by a combination of a pull-out operation and a displacement operation.

Moreover, the detection result of the telescopic motion amount detected by the telescopic motion sensor can be used, for example, for controlling increase and decrease of running speed by using the push-in operation as an acceleration operation and the pull-out operation as a brake operation. In this case, approximately the whole of the operations for driving a vehicle can be provided by the combination of displacement operations and telescopic operations of the operation lever 22.

The operation lever 22 shown in FIGS. 10A and 10B is supported on the upper face of the slider 21 so as to freely swing around a rotational axis 26 and attached to the slider 21 so as to swing in upward and downward directions. The swinging operation amount is detected by a swing angle sensor (which is not illustrated in the figure) provided at the support portion of the operation lever 22.

With this embodiment, a driver gripping the grip 23 can perform a displacement operation of the operation lever 22 along the guiding member 20 as well as a swinging operation of the operation lever 22 in upward and downward directions at respective displacement positions. The swing angle in upward and downward directions of the operation lever 22 detected by the swing angle sensor can be used, for example, for controlling the correspondence between the displacement amount of the operation lever 22 and the movement amount of the steering actuator, or what is called a transfer ratio of steering. In this case, a wide variety of steering forms can be provided including an example wherein a large scale steering is performed by a combination of an upward swinging operation and a right and left displacement operation of the operation lever 22 while a small scale steering is performed by a combination of a downward swinging operation and a right and left displacement operation.

Moreover, the detection result of the swing angle in upward and downward directions detected by the swing angle sensor can be used, for example, for controlling increase and decrease of running speed by using the upward swinging operation as an acceleration operation and the downward swinging operation as a brake operation. In this case, approximately the whole of the operations for driving a vehicle can be provided by the combination of right and left displacement operations and upward and downward swinging operations of the operation lever 22. It should be noted that the swing directions of the operation lever 22 are not limited to the upward and downward directions shown in the figure and may be other directions such as right and left directions.

Figure 11:
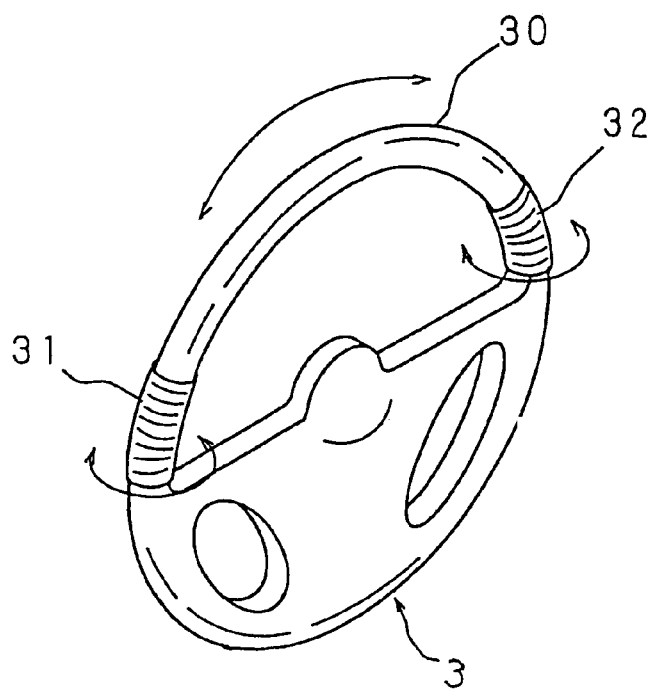
FIG. 11 is a view for showing the eleventh embodiment of steering means provided in a steering apparatus for a vehicle according to the present invention.

FIG. 11 is a view for showing the eleventh embodiment of steering means provided in a steering apparatus for a vehicle according to the present invention. As shown in the figure, the steering means 3 comprises a steering wheel 30 and a left grip 31 and a right grip 32 which are provided respectively at left and right parts of a ring portion of the steering wheel 30.

The steering wheel 30 is a known steering means which is fixed to one end of a column shaft which is not illustrated in the figure and turned on the axis of the column shaft. The operation amount thereof is detected by a rotational angle detector attached to the column shaft. The detection result is used for controlling an operation of a steering actuator disposed in a steering mechanism which is not illustrated in the figure. The control may be performed in control procedures which are disclosed in Japanese Patent Application Laid-Open No. 10-218000 by the present applicant.

The left grip 31 and the right grip 32 attached to such a steering wheel 30 are constructed so as to be twisted by a driver gripping them. The twist amount is detected separately by sensors (which are not illustrated in the figure) attached respectively at inner portions thereof. Each detection result is added to a rotation operation amount in the same direction of the steering wheel 30 as a signal indicating the corrective steering amount in the direction and is used for controlling an operation of a steering actuator.

With this embodiment, the driver can perform steering in right and left directions by turning operations of the steering wheel 30 and perform corrective steering by twisting operations of the left grip 31 and the right grip 32 in this state. Consequently, steering with high accuracy can be easily realized. Moreover, since steering of a small angle to the right or the left can be performed only by a twisting operation of the left grip 31 or the right grip 32, a load in steering can be decreased and tiredness in driving for a long time can be reduced.

Figure 12:
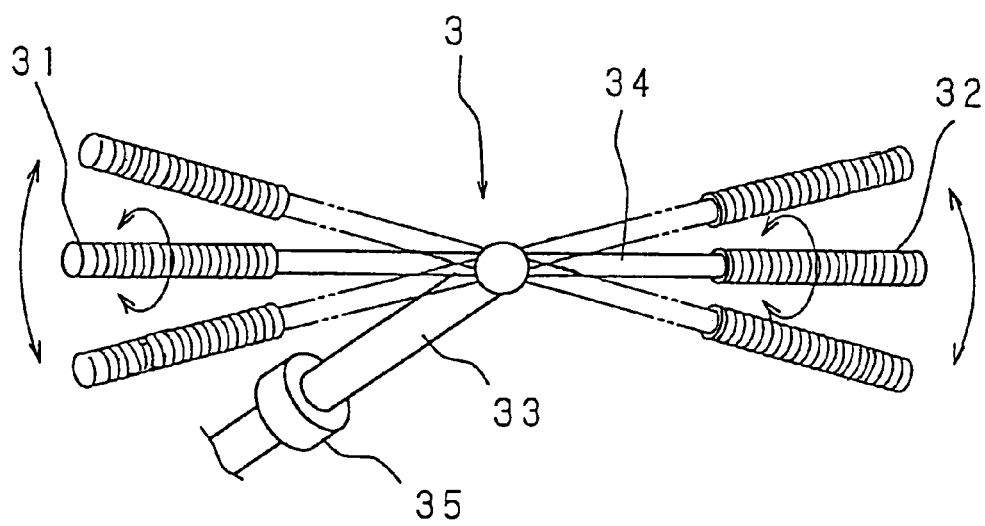
FIG. 12 is a view for showing the twelfth embodiment of steering means provided in a steering apparatus for a vehicle according to the present invention.

FIG. 12 is a view for showing the twelfth embodiment of steering means provided in a steering apparatus for a vehicle according to the present invention. As shown in this figure, the steering means 3 comprises a rod-shaped steering bar 34 attached to one end of the column shaft 33 so as to cross the column shaft 33 at a right angle and the same left grip 31 and right grip 32 as those of the embodiment shown in FIG. 11 at left and right ends of the steering bar 34.

The steering bar 34 is a substitute for the steering wheel of the embodiment shown in FIG. 11 and can be turned on the axis of the column shaft 33 within a predetermined angle range. The turning operation amount is detected by a rotational angle detector 35 attached to the column shaft 33. The left grip 31 and the right grip 32 at the ends of the steering bar 34 are constructed so as to be twisted by the driver gripping them. The twisting operation amount is detected separately by sensors attached respectively to inner portions of the left grip 31 and the right grip 32. Each detection result is, for example, added to a rotation operation amount in the same direction of the steering bar 34 as a signal indicating the corrective steering amount in the direction and the addition result is used for controlling an operation of a steering actuator disposed in a steering mechanism which is not illustrated in the figure.

With this embodiment, the driver grips the left grip 31 and the right grip 32 at the ends of the steering bar 34 and turns the steering bar 34 right and left by pushing and pulling the respective sides, so as to perform steering according to the operations. The driver further performs a twisting operation of the left grip 31 or the right grip 32 in this state so as to perform a corrective steering of a small angle. Consequently, steering with high accuracy can be easily realized. Moreover, since steering of a small angle to the right or the left can be performed only by a twisting operation of the left grip 31 or the right grip 32, a load in steering can be decreased and tiredness in driving for a long time can be reduced.

It should be noted that the steering wheel 30 or the steering bar 34 in these embodiments may be fixed so as not to be rotatable so that steering is performed only by a twisting operation of the left grip 31 and the right grip 32. It is also possible to attach pressure sensors 36 and 37 at the left grip 31 and the right grip 32, detect grip force applied to the grips 31 and 32 and perform steering to the left and the right based on the detection result.

In the structure for detecting grip force applied to the left grip 31 and the right grip 32 as mentioned above, the left grip 31 and the right grip 32 may be provided separately from the steering wheel 30 or the steering bar 34 so that the driver can steer the vehicle by gripping and operating the operation member placed at a suitable position in the passenger's room. With this structure, no limit exists in the driving position of the driver and tiredness in driving can be further reduced.

Figure 13:
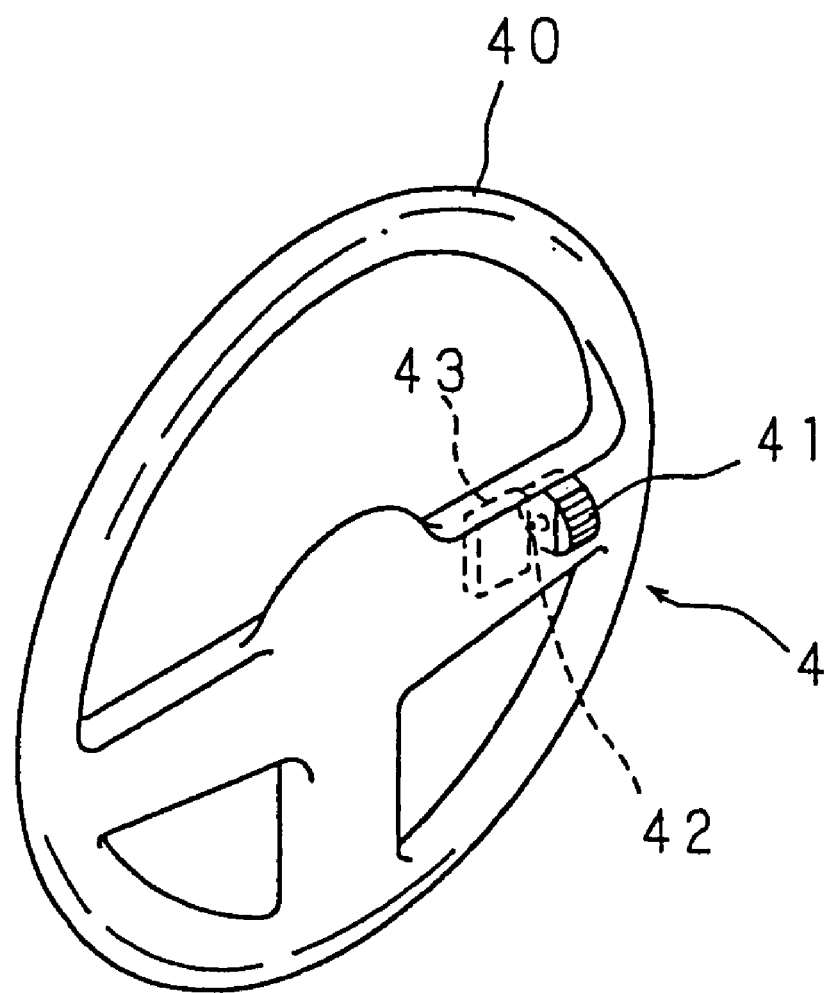
FIG. 13 is a view for showing the thirteenth embodiment of steering means provided in a steering apparatus for a vehicle according to the present invention.

FIG. 13 is a view for showing the thirteenth embodiment of steering means provided in a steering apparatus for a vehicle according to the present invention. As shown in this figure, the steering means 4 comprises a steering wheel 40 and a jog dial 41 which is disposed on an upper face of a spoke portion of the steering wheel 40 in proximity to a ring portion.

The steering wheel 40 is a known steering means which is fixed to one end of a column shaft which is not illustrated in the figure and turned on the axis of the column shaft. The turning operation amount thereof is detected by a rotational angle detector attached to the column shaft. The detection result is used for controlling an operation of a steering actuator disposed in a steering mechanism which is not illustrated in the figure. The control operation is disclosed in Japanese Patent Application Laid-Open No. 10-218000 by the present applicant.

The jog dial 41 attached to such a steering wheel 40 is constructed so as to be turned on a center shaft 42 extending in an approximately radial direction of the steering wheel 40 and to be pushed in a radial direction of the center shaft 42. The direction and amount of the rotation operation and existence of the pushing operation are detected by a sensor unit 43 attached to one side of the center shaft 42. Rotation directions of the jog dial 41 are respectively correlated with steering directions to the right and left. The detection result of the rotation amount is, for example, added to the rotation operation amount in the same direction of the steering wheel 40 as signals indicating the corrective operation amount to the respective sides and used for controlling an operation of the steering actuator.

With this embodiment, the driver can perform steering in right and left directions by turning operations of the steering wheel 40 and perform corrective steering by rotation operations of the jog dial 41 in this state. Consequently, steering with high accuracy can be easily realized. Moreover, since steering of a small angle to the right or the left can be performed only by a rotation operation of the jog dial 41, a load in steering can be decreased and tiredness in driving for a long time can be reduced.

A pushing operation of the jog dial 41 detected by the sensor unit 43 is used as a signal instructing acceptance and release of the rotation operation of the jog dial 41. In other words, steering or corrective steering by rotation operation of the jog dial 41 requires a pushing operation for the acceptance. Detection results of direction and amount of a rotation operation after the pushing operation of the jog dial 41 are used for steering or corrective steering. Steering performed in this manner is released by another pushing operation. In this manner, it is possible to prevent occurrence of a problem that steering or corrective steering based on unintended operations of the jog dial 41 is performed.

It should be noted that the steering wheel 40 in this embodiment may be fixed so as not to be rotatable so that steering is performed only by a rotation operation of the jog dial 41. In this case, it is also possible to dispose the jog dial 41 separately from the steering wheel 40 so that the driver can steer the vehicle by performing a rotation operation at a suitable position in the passenger's room. With this structure, no limit exists in the driving position of the driver and tiredness in driving can be further reduced. Furthermore, a dial which cannot accept a pushing operation may be employed in place of the jog dial 41.

Figure 14:
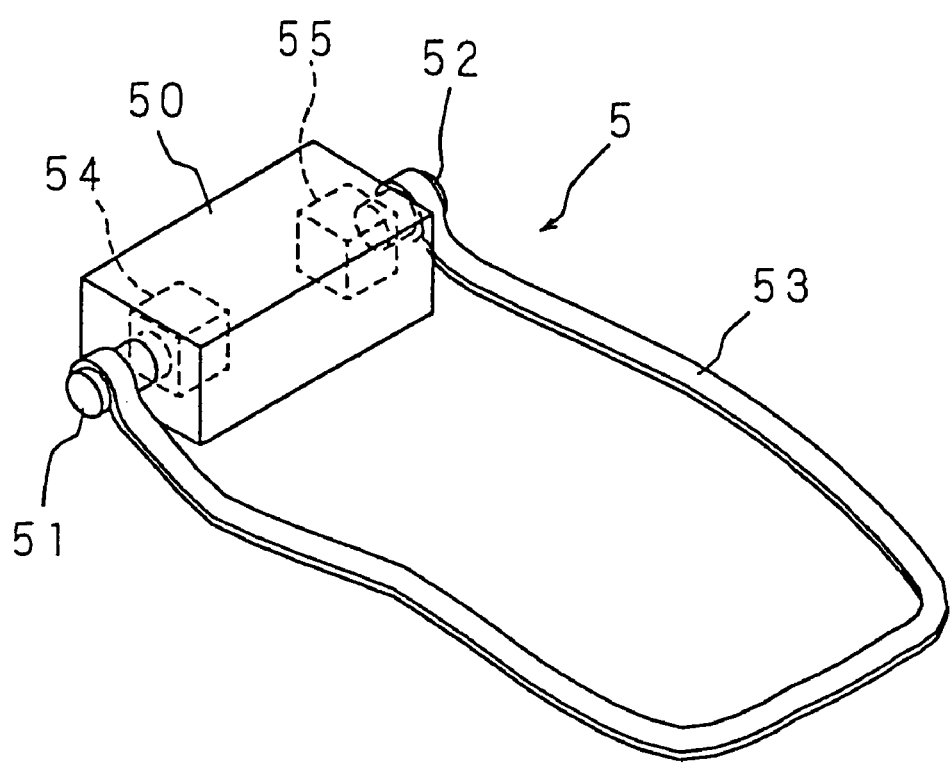
FIG. 14 is a view for showing the fourteenth embodiment of steering means provided in a steering apparatus for a vehicle according to the present invention.

FIG. 14 is a view for showing the fourteenth embodiment of steering means provided in a steering apparatus for a vehicle according to the present invention. As shown in this figure, the steering means 5 is constructed by connecting end portions of an operation member 53, which is configured as a strip-shaped member having a predetermined length, respectively with a pair of supporting rods 51 and 52 projected at both sides of a supporting box 50 so as to form a U-shaped operation portion by the operation member 53 between the supporting rods 51 and 52. The steering means 5 is disposed at a suitable position in a vehicle which is not illustrated in the figure with the supporting rods 51 and 52 extending in right and left directions.

A pair of left and right force sensors 54 and 55 for detecting action forces applied to the supporting rods 51 and 52 is disposed in the supporting box 50. When the left half portion of the U-shaped operation member 53 is pulled, the force sensor 54 detects an action force applied to the supporting rod 51 at the same side while when the right half portion of the operation member 53 is pulled, the force sensor 55 detects an action force applied to the supporting rod 52 at the same side. The strengths of the action forces detected in this manner is used as operation amounts in directions corresponding to the respective supporting rods 51 and 52 and used for controlling an operation of a steering actuator disposed in a steering mechanism which is not illustrated in the figure.

With this embodiment, the driver sits to face the front face of the supporting box 50, grips the middle portions of the U-shaped operation member 53 from right and left sides by his right and left hands and pulls either one of the right and left grip portions so as to perform steering in directions corresponding to the pulling operations. Since steering in the respective directions are performed quantitatively in accordance with the strengths of the operation forces detected at the force sensors 54 and 55, steering amount can be adjusted on the basis of the strength of the pulling operation of a right or left grip portion.

This embodiment can be structured so as to brake the vehicle when right and left grip portions of the operation member 53 are pulled simultaneously and the force sensors 54 and 55 detect approximately the same action forces. Such a structure can be used for controlling decrease of running speed. Furthermore, this embodiment can be structured so as to accelerate the vehicle when the force sensors 54 and 55 detect periodical force change. Such a structure can also be used for controlling increase of running speed. Such a periodical force change is generated when a "horse-rushing operation" (which is a swing operation to be performed on the reins of the horse when rushing a horse) is performed on the operation member 53. The driver can increase and decrease the vehicle by such a "horse-rushing operation" and a pulling operation. Furthermore, approximately the whole of the operations for driving a vehicle can be provided by a combination of these operations and steering by right and left pulling operations of the operation member 53.

The operation of the operation member 53 mentioned above is identical with the operation for handling a horse. Consequently, the driver can drive and steer the vehicle with a horse-riding feeling, a load in steering can be decreased and tiredness in driving can be reduced.

Figure 15:
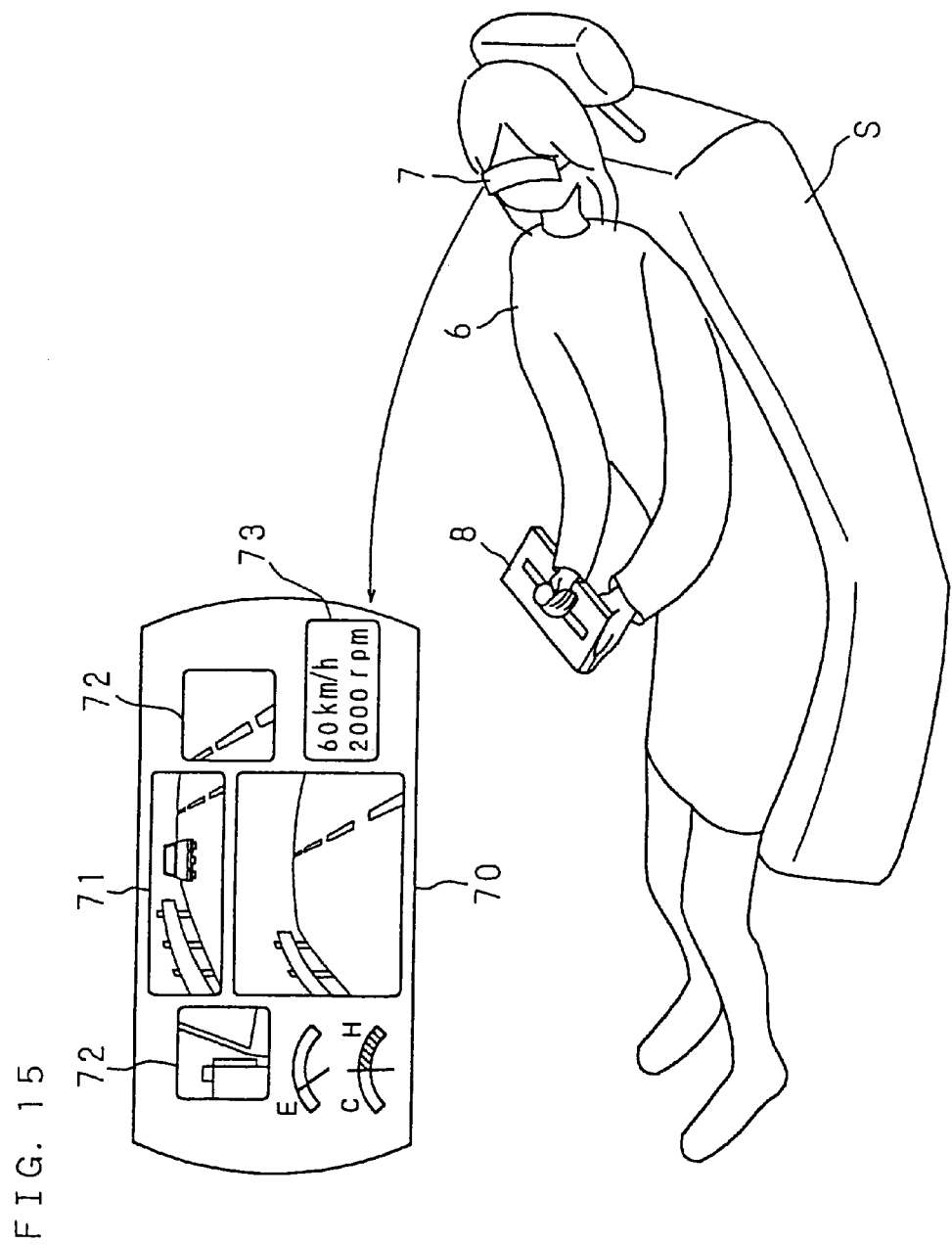
FIG. 15 is an explanatory view for showing a state at the time of steering, which can be realized by a vehicle including one of the steering means shown in FIG. 1A through FIG. 14.

FIG. 15 is an explanatory view for showing a steering state realizable in a vehicle provided with the aforementioned steering apparatus. As shown in the figure, the driver 6 lies on his back on a reclining seat S wearing a pair of goggles 7 capable of displaying a predetermined image on the inner face of the lenses on so as to perform a predetermined operation while gripping the steering means 8. Displayed on the inner face of the goggles 7 are an image 70 showing the view in front of the vehicle, images 71 and 72 showing a view behind the vehicle and views at the sides of the vehicle and an image 73 displaying meters required for driving operations such as meters indicating a vehicle speed and an engine speed. With this structure, a desired steering can be performed by an operation of the steering means 8 performed by the driver 6 who views these images.

The steering means 8 shown in FIG. 15 is constructed separately from structure members in the passenger's room, and can be structured by attaching, to an operation box which the driver can grip while lying on the back as shown in FIG. 15, the steering means 1 shown in FIGS. 1A through 7 comprising the operation plate 11 to be operated to swing right and left, steering means 2 shown in FIGS. 8A through 10B comprising the operation lever 22 so as to be displaced right and left, steering means 3 shown in FIGS. 11 and 12 comprising the left and right grips 31 and 32 so as to be twisted or gripped for making operations, or the steering means 4 shown in FIG. 13 comprising a dial, such as the jog dial 41, so as to be rotated.

As described above in detail, with a steering apparatus for a vehicle according to the present invention which requires a small operation amount and can steer the vehicle by operations of an operation member performed easily, a load in steering can be decreased and tiredness in driving can be reduced. Moreover, such a steering apparatus can provide physically handicapped drivers with opportunities of driving. Furthermore, when the operation member is disposed in a suitable position in the passenger's room, the driver can operate the member in a comfortable position.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A steering apparatus for a vehicle, comprising a steering unit and a steering mechanism which is provided mechanically separately from the steering unit and operates on the basis of detection results of an operation direction and an operation amount of the steering unit,
the steering unit including:
a plate-shaped operation member supported so as to freely rock about a fulcrum; and
a detector for detecting a rocking direction and a rocking angle of the operation member respectively as the operation direction and the operation amount.

2. The steering apparatus for a vehicle according to claim 1,
wherein the steering unit further includes:
a first shaft projected from a part of a body of the vehicle;
a second shaft, which is coupled with the first shaft so as to be shifted with regard to the first shaft, for supporting the operation member; and
a displacement detector for detecting a displacement direction and a displacement amount of the second shaft, and
the steering mechanism operates on the basis of the rocking direction and the rocking angle of the operation member detected by the detector and the displacement direction and the displacement amount of the second shaft detected by the displacement detector.

3. The steering apparatus for a vehicle according to claim 1,
wherein the steering unit further includes:
a supporting shaft, which is projected from a part of a body of the vehicle, for supporting the operation member so as to be rotated on a center axis thereof; and
a rotation detector for detecting a rotation direction and a rotation amount of the operation member, and
the steering mechanism operates on the basis of the rocking direction and the rocking angle of the operation member detected by the detector and the rotation direction and the rotation amount of the operation member detected by the rotation detector.

4. A steering apparatus for a vehicle, comprising a steering unit and a steering mechanism provided mechanically separately from the steering unit,
the steering unit including:
a support connected to the vehicle and having a longitudinal support axis;
an operation member mounted on the support for pivotal movement about a pivot axis different from and not parallel to the support axis; and
a detection unit operatively connected to the operation member and the steering mechanism for sending a signal indicative of the position of the operation member to the steering mechanism.

5. The steering apparatus of claim 4 wherein said operation member is rotationally fixed with respect to the support.

6. The steering apparatus of claim 5 wherein said operation member pivots about a pivot axis fixed with respect to said support.

7. The steering apparatus of claim 4 wherein said support comprises a first portion fixed with respect to the vehicle and a second portion slidingly supported by said first portion, said operational member being mounted on said second portion.

8. The steering apparatus of claim 4 wherein said operational member is rotatable about a rotational axis.

9. The steering apparatus of claim 8 wherein said support comprises a first portion fixed with respect to the vehicle and a second portion slidingly supported by said first portion, said operational member being mounted on said second portion.

10. The steering apparatus of claim 8 further including a reaction force applying means operationally connected to said operation member.

11. A steering apparatus for a vehicle, comprising:
a steering unit comprising an operation member and a detector;
a steering mechanism controlled by and mechanically separate from the steering unit,
the operation member being mounted for pivotal movement about a fulcrum and having first and second gripping portions on opposite sides of the fulcrum; and
the detector communicating a detected pivot direction of the operation member to the steering mechanism as an operation direction and a detected pivot angle of the operation member to the steering mechanism as an operation amount.

12. The steering apparatus of claim 11, further including:
a first shaft projecting from the vehicle;
a second shaft slidably coupled to the first shaft and shiftable with respect to the first shaft, the operation member being supported by the second shaft; and
a displacement detector for detecting a displacement direction and a displacement amount of the second shaft and communicating the displacement direction and displacement amount to the steering mechanism.

13. The steering apparatus of claim 12 wherein said second shaft is telescopically mounted on said first shaft.

14. The steering apparatus of claim 12 wherein said operation member has first and second spaced ends, said first end pivoting toward said first shaft when said second end pivots away from said first shaft.

15. A steering apparatus for a vehicle, comprising:
a support;
a steering unit supported by said support;
a steering mechanism controlled by and mechanically separate from the steering unit;
said steering unit comprising an operation member having first and second spaced ends pivotably mounted on said support such that said first and second ends move toward and away from said support as said operation member pivots with respect to said support, a point on said first end moving along an arc that intersects said support as said first end moves toward said support; and
a detector for detecting a pivot direction of the operation member as an operation direction and a pivot angle of the operation member as an operation amount.

* * * * *